(12) United States Patent
Seiffert et al.

(10) Patent No.: US 11,588,979 B2
(45) Date of Patent: Feb. 21, 2023

(54) SYSTEM AND METHOD FOR CAPTURING MEASUREMENT IMAGES OF AN OBJECT TO BE MEASURED

(71) Applicant: Fraunhofer-Gesellschaft zur Förderung der angewandten Forschung e.V., Munich (DE)

(72) Inventors: Udo Seiffert, Harsleben (DE); Andreas Herzog, Brandenburg (DE); Andreas Backhaus, Magdeburg (DE)

(73) Assignee: Fraunhofer-Gesellschaft zur Förderung derr angewandten Forschung e.V., Munich (DE)

( * ) Notice: Subject to any disclaimer, the term of this patent is extended or adjusted under 35 U.S.C. 154(b) by 0 days.

(21) Appl. No.: 17/248,759

(22) Filed: Feb. 5, 2021

(65) Prior Publication Data

US 2021/0185212 A1  Jun. 17, 2021

Related U.S. Application Data

(63) Continuation of application No. 16/472,023, filed as application No. PCT/EP2017/084212 on Dec. 21, 2017, now Pat. No. 10,951,831.

(30) Foreign Application Priority Data

Dec. 23, 2016 (DE) ..................... 10 2016 226 206.8

(51) Int. Cl.
*H04N 5/235* (2006.01)
*G01N 21/25* (2006.01)
(Continued)

(52) U.S. Cl.
CPC ......... *H04N 5/2352* (2013.01); *G01N 21/255* (2013.01); *G01N 21/27* (2013.01); *H04N 9/04* (2013.01)

(58) Field of Classification Search
None
See application file for complete search history.

(56) References Cited

U.S. PATENT DOCUMENTS 9,414,780 B2  8/2016  Rhoads
10,951,831 B2  3/2021  Seiffert et al.
(Continued)

FOREIGN PATENT DOCUMENTS

CN  103577803 A  2/2014
CN  105409206 A  3/2016
(Continued)

OTHER PUBLICATIONS

"U.S. Appl. No. 16/472,023, PTO Response to Rule 312 Communication mailed Feb. 19, 2021", 2 pgs.
(Continued)

*Primary Examiner* — Reza Aghevli
(74) *Attorney, Agent, or Firm* — Schwegman Lundberg & Woessner P.A.

(57) ABSTRACT

Systems and methods for capturing measurements of images of an object to be measured using a mobile electronic device are disclosed. A method may include capturing a measurement image of a measured object within an observation region of a camera of the device, displaying a light-emitted image on a screen of the device, causing the screen to successively display multiple illumination images of a predefined illumination image sequence, and causing the screen of the device to display one or more of the illumination images of the predefined illumination images. The predefined illumination image sequence is set via a user interface of the device and a selection between different predefined illumination image sequences is rendered using the user interface. A control unit is configured to select a predefined illumination image sequence between several stored predefined illumination image sequences in dependence on a selection of the measured object of interest and/or a characteristic of interest.

20 Claims, 7 Drawing Sheets

Figure 1:
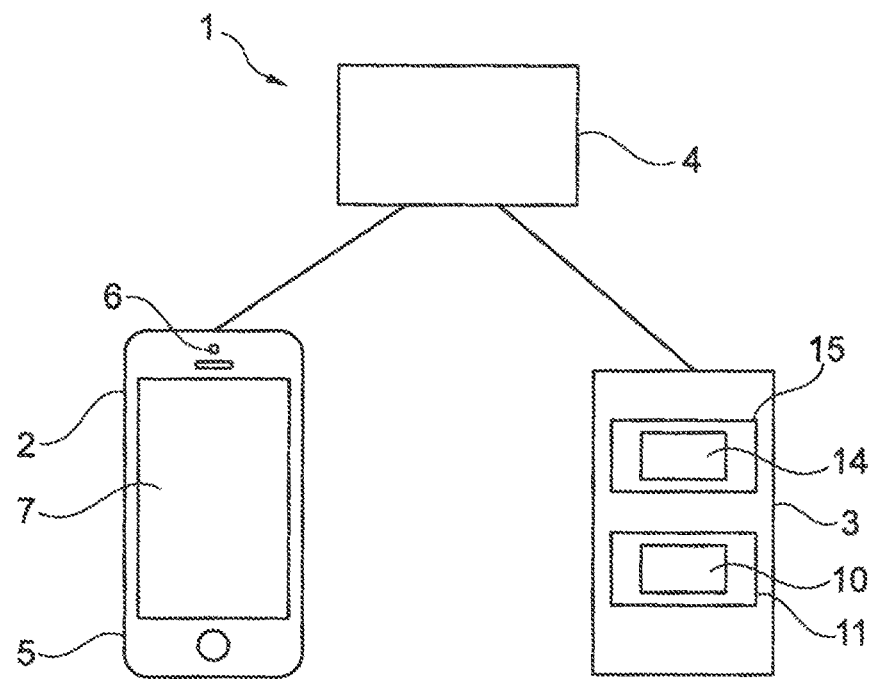

(51) Int. Cl.
*G01N 21/27* (2006.01)
*H04N 9/04* (2006.01)

(56) References Cited

U.S. PATENT DOCUMENTS

| | | | | |
|---|---|---|---|---|
| 2014/0028799 A1* | 1/2014 | Kuffner | ............... | G01B 11/245 348/46 |
| 2015/0002735 A1 | 1/2015 | Moskovchenko | | |
| 2015/0062584 A1 | 3/2015 | Hennebelle | | |
| 2015/0363481 A1* | 12/2015 | Haynes | ................. | G06Q 10/10 707/748 |
| 2015/0366518 A1* | 12/2015 | Sampson | ............. | A61B 5/0205 600/509 |
| 2016/0109219 A1* | 4/2016 | Ackley | ................. | G01B 11/00 348/136 |
| 2016/0188914 A1* | 6/2016 | Ackley | .............. | H04N 1/00074 235/375 |
| 2016/0225301 A1 | 8/2016 | Scepanovic et al. | | |
| 2016/0316124 A1* | 10/2016 | Bessettes | ............. | H04N 5/2351 |
| 2016/0343176 A1* | 11/2016 | Ackley | ................. | G06V 30/224 |
| 2016/0364586 A1* | 12/2016 | Todeschini | ......... | G06K 7/10891 |
| 2016/0377414 A1* | 12/2016 | Thuries | ................ | G02B 3/0056 359/558 |
| 2017/0010141 A1* | 1/2017 | Ackley | ................. | G01B 11/00 |
| 2017/0016714 A1* | 1/2017 | Laffargue | ............ | G06F 3/04817 |
| 2018/0332204 A1* | 11/2018 | Chien | ................ | F21V 23/0435 |
| 2020/0195826 A1 | 6/2020 | Seiffert et al. | | |

FOREIGN PATENT DOCUMENTS

| | | |
|---|---|---|
| EP | 2690397 | 1/2014 |
| EP | 2690397 A1 | 1/2014 |
| EP | 2821762 A1 | 1/2015 |
| EP | 3184977 A1 | 6/2017 |
| JP | 2014025935 | 2/2014 |
| JP | 2015513077 | 4/2015 |
| JP | 2015127680 A | 7/2015 |
| RU | 2573810 C1 | 1/2016 |
| RU | 2601678 C2 | 11/2016 |
| WO | WO-03067936 A1 | 8/2003 |
| WO | WO-2013120956 A1 | 8/2013 |
| WO | WO-2014113770 A1 | 7/2014 |
| WO | WO-2017055580 A1 | 4/2017 |

OTHER PUBLICATIONS

"Russian Application Serial No. 2019121249/07, Office Action and Search Report dated Mar. 4, 2021", w/ English Translation, (Mar. 4, 2021), 17 pgs.

"Japanese Application Serial No. 2019-534173, Office Action dated Sep. 20, 2021", w English Translation, (Sep. 28, 2021), 12 pgs.

"Australian Application Serial No. 2019-534173, Office Action dated Sep. 22, 2021", (Sep. 22, 2021), 5 pgs.

"Indian Application Serial No. 201917026615, Office Action dated Aug. 16, 2021", (Aug. 16, 2021), 6 pgs.

"Japanese Application Serial No. 2019-534173, Office Action dated Feb. 8, 2022", w English Translation, (Feb. 8, 2022), 7 pgs.

"U.S. Appl. No. 16/472,023, Corrected Notice of Allowability dated Dec. 21, 2020", 2 pgs.

"U.S. Appl. No. 16/472,023, Non Final Office Action dated May 28, 2020", 16 pgs.

"U.S. Appl. No. 16/472,023, Notice of Allowance dated Nov. 2, 2020", 9 pgs.

"U.S. Appl. No. 16/472,023, Preliminary Amendment filed Jun. 20, 2019", 11 pgs.

"U.S. Appl. No. 16/472,023, Response filed Sep. 28, 2020 to Non Final Office Action dated May 28, 2020", 11 pgs.

"U.S. Appl. No. 16/4732,023 312 Amendment filed Feb. 5, 2021", 4 pgs.

"Chinese Application Serial No. 201780087346.1, Office Action dated Nov. 3, 2020", w/English Translation, (Nov. 3, 2020), 19 pgs.

"European Application Serial No. 17 823 141.1, Office Action dated May 4, 2020", (May 4, 2020), 9 pgs.

"German Application Serial No. 10 2016 226 206.8 Examination Report dated Oct. 9, 2017", (Oct. 9, 2017), 9 pgs.

"International Application Serial No. PCT/EP2017/084212, International Search Report dated Mar. 2, 2018", (Mar. 2, 2018), 3 pgs.

"International Application Serial No. PCT/EP2017/084212, Written Opinion dated Mar. 2, 2018", (Mar. 2, 2018), 9 pgs.

"Singapore Application Serial No. 11201905753Y, Office Action dated Aug. 4, 2020", (Aug. 4, 2020), 6 pgs.

Iqbal, Zafar, et al., "Spectral fingerprinting on a standard mobile phone", Journal of Sensors 2010, (2010), 9 pgs.

Madden, Michael G., et al., "A machine learning application for classification of chemical spectra", International Conference on Innovative Techniques and Applications of Artificial Intelligence, (2008), 14 pgs.

"Korean Application Serial No. 10-2019-7021539, Office Action dated Feb. 22, 2022", w English Translation, (Feb. 22, 2022), 10 pgs.

Iqbal, Zafar, "Spectral fingerprinting on a standard mobile phone", Journal of Sensors 2010, (2010), 9 pgs.

Madden, Michael G., "A machine learning application for classification of chemical spectra", International Conference on Innovative Techniques and Applications of Artificial Intelligence. Springer, London, (2008), 15 pgs.

* cited by examiner

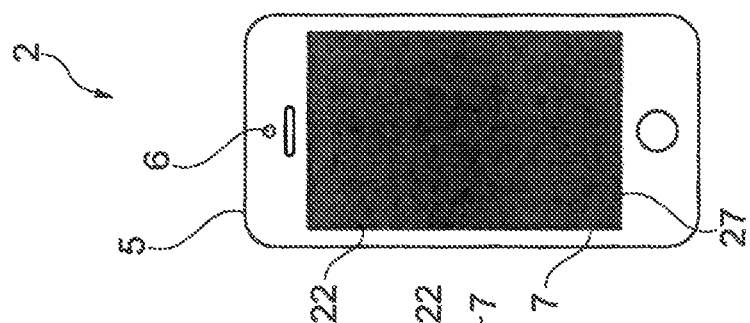
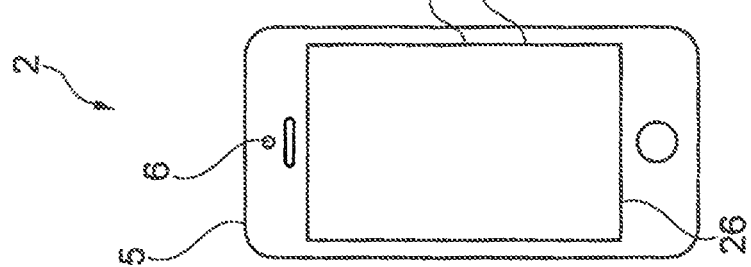
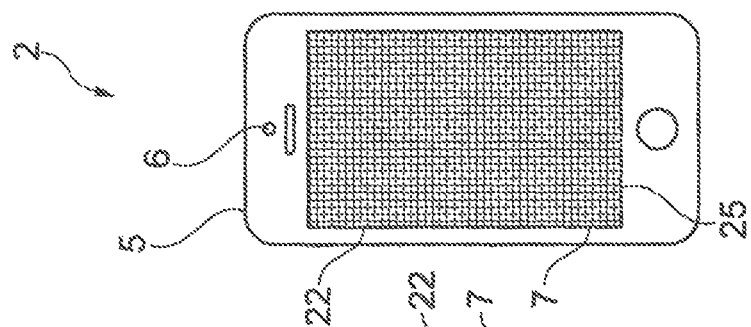
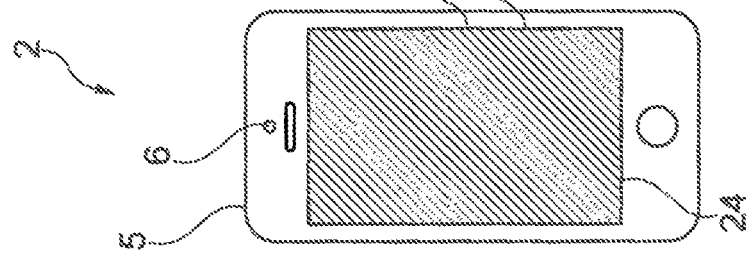
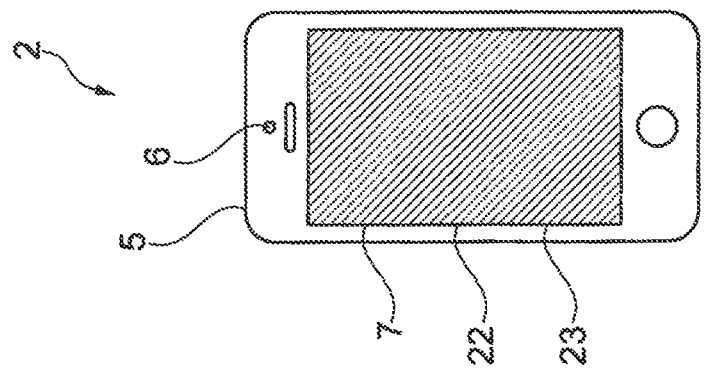

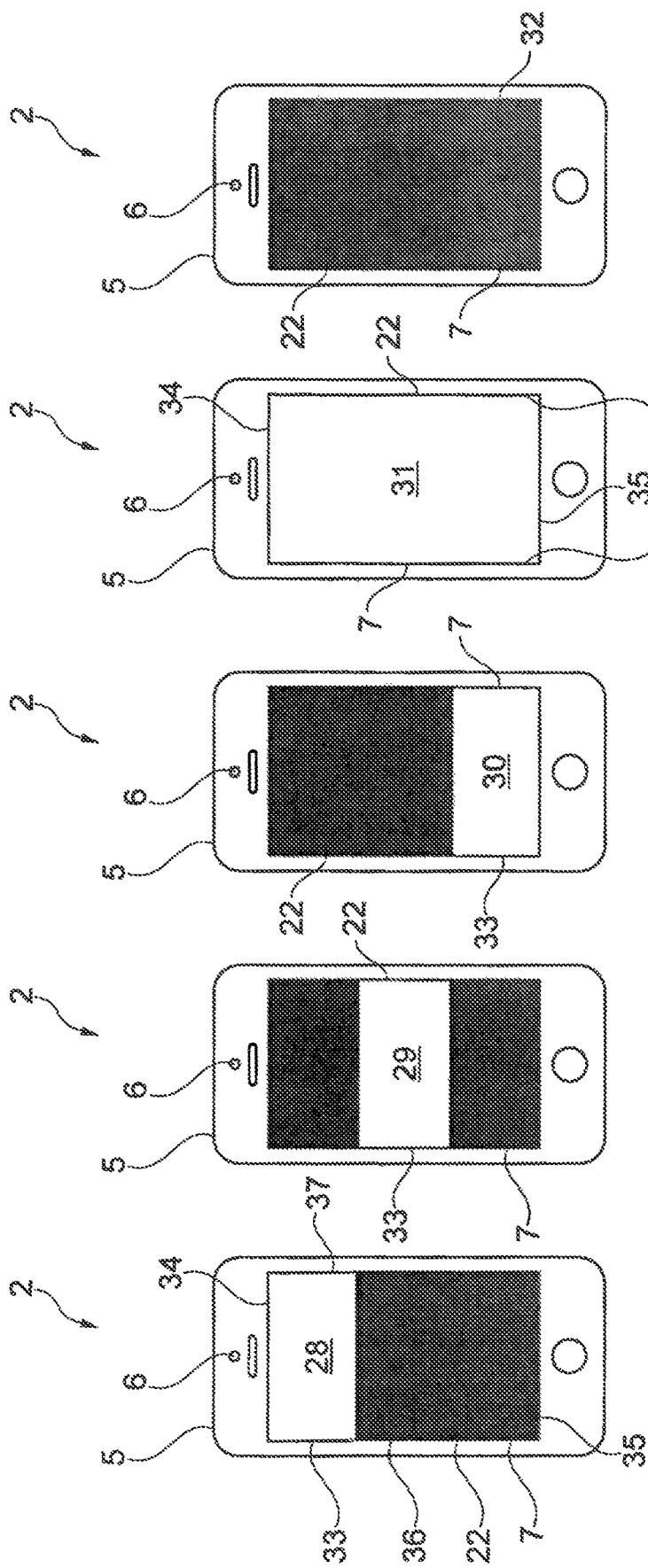

SYSTEM AND METHOD FOR CAPTURING MEASUREMENT IMAGES OF AN OBJECT TO BE MEASURED

CLAIM FOR PRIORITY

This application is a continuation of U.S. application Ser. No. 16/472,023, filed Jun. 20, 2019, which is a U.S. National Stage Filing under 35 U.S.C. 371 from International Application No. PCT/EP2017/084212, filed on Dec. 21, 2017, and published as WO2018/115346 on Jun. 28, 2018, which claims the benefit of priority to German Application No. 10 2016 226 206.8, filed on Dec. 23, 2019; the benefit of priority of each of which is hereby claimed herein, and which applications and publication are hereby incorporated herein by reference in their entireties.

The invention relates to a system for capturing measurement images of a measured object as well as to a method for capturing measurement images of a measured object by way of the system, and to a corresponding computer program product.

In many technical and non-technical applications, the characteristics of an object which are of interest depend on the (bio-)chemical composition of the object. Structures on the surface or layers of the object which are close to the surface and which are not visible to the naked eye, depending on their transparency in certain spectral regions, can also influence certain characteristics of the object. For this reason, the optical detection of size, shape and colour of the object or of the macroscopic (still recognisable with the naked eye) surface texture of the object as a rule are not adequate for a satisfactory assessment of such characteristics. The lens detection of the condition of foodstuffs with regard to freshness and the untreated state, the concealed repair of automobile paintwork after accident damage, but also the recognition of document, medicine and high-quality textile counterfits, are mentioned as examples.

The hyperspectral image capture of objects is applied in many cases, above all in commercial applications and research. Herein, hyperspectral measurement images are captured from the object and these represent the spectral reflection characteristics of the object in a spatially resolved manner. The respective characteristics of the object which are of interest can be assessed on the basis of these measurement images. Two approaches are known for the capture of hyperspectral measurement images. With regard to the first approach, the object is illuminated with a broad-band light source, the reflected light separated into its spectral constituent parts via narrow-band frequency filters, prisms or gratings and individually imaged by way of a spectral camera. The broad-band uniform illumination can be realised artificially over a large surface or can utilise daylight as a natural illumination. According to the second approach, this principle is reversed and a broad-band greyscale camera is used for image capture and the object is sequentially illuminated with narrow-band light sources. This variant is used above all with small-surfaced objects in the field of laboratories or microscopy. LEDs or filter wheels which are sorted for example according to spectra are then used for illumination.

One disadvantage of the known methods for capturing hyperspectral measurement images of an object in particular are the high costs for the required devices, such devices as a rule being complex laboratory measuring devices and in many cases configured and optimised for certain applications. Many other methods with which measurement images of objects to be examined are captured also have this disadvantage. Many technically suitable methods in practise cannot therefore be implemented in an economically viable manner, in particular in the field of consumers. Further disadvantages of many known methods for capturing measurement images of objects to be examined are moreover the high time expense as well as the necessity for special technical knowledge on operating the devices or on carrying out the method.

It is therefore the object to suggest a system for capturing measurement images of an object to be examined, also called a measured object, which system is as inexpensive as possible, as simple as possible to operate, and able to be applied as flexibly as possible. Despite this, the measurement images should permit a good as possible assessment of characteristics of an object which are of interest. Furthermore, a method for capturing corresponding measurement images is to be suggested, said method being able to be carried out as simply and inexpensively as possible and being able to be applied in a flexible manner. Finally, a corresponding computer program product is to be suggested, said product being able to be loaded directly into an internal memory of the suggested system and comprising a software code, with which the steps of the suggested method are carried out when the computer program product runs on the system.

This object is achieved by a system according to the main claim as well as by a method and a computer program product according to the other independent claims. Further developments and particular embodiment examples result from the dependent claims, the subsequent description and the figures.

The suggested system for capturing measurement images of a measured object herewith comprises at least one mobile electronic device such as for example a smartphone or a tablet computer or another (digital) computer. The (at least one) mobile electronic device which hereinafter is often simply referred to as the "device", (each) comprises:

- a housing,
- a camera which is integrated in the housing, for capturing measurement images of a measured object within an observation region of the camera, thus of a spatial region which is capturable by the camera;
- a screen which is integrated in the housing, for the light-emitting displaying of images which are represented on the screen, for example for the displaying of a predefined illumination image sequence in the form of images which are sequentially represented on the screen, wherein the screen faces the observation region of the camera,
- a control unit which is integrated in the housing and is configured to activate the screen of the mobile electronic device into successively displaying several different illumination images of a predefined illumination image sequence, wherein the control unit is configured to activate the camera of the mobile electronic device into capturing a measurement image of the measured object synchronously with the displaying of each illumination image of the predefined illumination image sequence.

The suggested method for capturing measurement images of a measured object can be carried out with the system suggested here and comprises the steps:

- by way of the control unit, activating the screen of the mobile electronic device into successively displaying several different illumination images of the predefined illumination image sequence, activating the camera of the mobile electronic device into capturing a measurement image of the measured object synchronously with the displaying of each illumination image of the predefined illumination image sequence.

The electronic mobile device typically comprises at least one internal data memory which is integrated into the housing of the device. The internal data memory is typically a volatile or non-volatile data memory or a combination thereof, for example a RAM, a ROM, a hard disc drive or a solid state drive or a combination thereof.

The suggested computer program product can be loaded directly into the internal data memory of the device. The computer program product comprises software code sections, with which at least the aforementioned steps of the suggested method (and possibly further steps of the method) are carried out when the computer program product is loaded on the mobile electronic device and runs.

The computer program product is for example a computer program which is stored on a data memory ("carrier"). The data memory is for example computer hardware such as a volatile or non-volatile data memory, for example the mentioned internal data memory of the device or a further data memory of the system outside the mobile electronic device, for example a data memory of a computer such as for example a computer server, or a data memory which is part of a computer network such as for example the Internet or a (computer) cloud or is generated by the computer network (e.g. Internet or cloud). The computer or computer server, the computer network (e.g. Internet or cloud) can be for example a further component of the system. A RAM, a ROM, a hard disc drive or a solid state drive or a combination thereof or also a CD, DVD or a USB stick can be considered as a possible (further) data memory.

The device typically comprises at least one (digital) processor, for example at least one main processor (CPU), which itself can comprise for example one or more integrated units (co-processors), for example a graphic processor. The processor can be realised for example in the form of an electronic circuit, for example as a semiconductor chip. The aforementioned control unit of the device can be a (logical or integrated) unit of the processor. The processor is connected for example to the internal data memory of the device in order to access the data memory, in particular in order to retrieve the computer program product which is loaded into the internal data memory, or its loaded software code sections, and to subsequently carry out (as the control unit of the device) the aforementioned steps of the method (synchronous activating of the screen and camera). The respective steps of the suggested method can be coded in the software code sections, for example in the form of instructions which can be carried out by way of the processor of the device. On carrying out these instructions, the processor then functions for example as the mentioned control unit of the device.

The suggested method can comprise further steps which are described hereinafter in more detail. The control unit of the device can be configured for carrying out these further method steps. Accordingly, the computer program product can also comprise further software code sections in which corresponding further instructions, which can be carried out by way of the processor of the device can be coded. On carrying out these further instructions, the processor then again functions for example as the mentioned control unit of the device or as a further unit of the device, for example as an evaluation unit of the device.

Alternatively, the further method steps can also be carried out by way of other components of the system. For example, the evaluation unit can be arranged externally of the mobile electronic device. The evaluation unit can therefore also for example be a correspondingly configured computer, for example a computer server of a computer network or a (logical or integrated) unit of a processor of the computer. Mixed forms, in which the evaluation unit is distributed onto several components of the system and is formed for example by way of (logical or integrated) units of several processors, for example of the processor of the device or of a processor of the mentioned computer or computer server, are also possible.

In some embodiment examples, the method can therefore be entirely implemented using only the mobile electronic device. In other embodiments, the method is partly also carried out by way of other components of the system, for example by way of one or more computers (such as e.g. Internet or cloud), wherein the communication and the data transmission between the device and the other components can be effected for example via the Internet or via a cloud.

The storing of data or of other application-relevant information in an external memory system (e.g. in a cloud memory) is neither necessary for function nor for security-related reasons, but is also not opposed to the concepts which are described here. For example, the use of external data memories can be envisaged if the storage of certain data on the internal data memory of the mobile device is not possible for certain reasons, for example due to large data quantities, for license reasons and/or for security reasons.

The primarily or exclusively local processing and/or storage of data by way of the mobile device can generally be provided or be provided in certain cases, for example (1) for reducing the data volume which is transferred (transmitted) from the mobile device to an external server/memory, (2) in case of insufficient bandwidth of a mobile data connection or a lack thereof at the respective location of the measurement (e.g. on an agriculturally used field or in steel concrete buildings), and (3) given sensitive data which could relate for example to the measured object, the location of the measurement or the user himself, particularly if the mobile device is equipped with a GPS module. For instance, the measurement of secret objects or secret chemical surface compositions are to be mentioned as examples, as well as the measurement at a location which is to be kept secret, for example if a location serves for storing the respective measured object or if the location of the measurement or the measurement data could permit undesired inference on the user, e.g. on the state of the health of the user, his residence or his consumer behaviour.

For example, the control unit of the mobile device and/or, inasmuch as is present, the evaluation unit of the mobile device can be configured to generally or at least in defined applications carry out the evaluation of the measurement data completely on its own and to store all occurring data exclusively in the internal data memory. The control unit can further be configured to avoid or to block the transfer of the measurement data and/or of data derived therefrom (in particular GPS data) onto external devices. Furthermore, the functionality of the system can be controlled, restricted or completely blocked on the basis of the GPS data.

Whenever, in the text below and in the claims, the control unit or the evaluation unit is described as "being configured" for carrying out further operations, then these operations are also to be understood as possible (optional) steps of the suggested method. Accordingly, the computer program product can comprise software code sections in which instructions for carrying out these further operations are coded, for example to be executed by the processor of the device or of another component of the system. Conversely, a "being configured" of a component is implied whenever it is described hereinafter that the method steps can be carried out by way of a respective component of the system, for example by way of the control unit, the evaluation unit, or another component. This "being configured" in turn can be rendered possible for example by way of loading the accordingly designed computer program product for example onto the device or onto the mentioned further computers of the system.

The predefined illumination image sequence is typically partly or preferably completely defined by illumination parameters. Specific examples for illumination parameters are described further below. The illumination parameters are typically stored on at least one data memory of the system, for example on the internal data memory of the mobile electronic device and/or on a data memory of another component of the system, for example of the mentioned computer. For example, an automatic storage of the illumination parameters on the internal memory of the device can be effected by way of the loading of the computer program product onto the device. For example, the software code of the computer program product can contain illumination parameter definitions and/or values. The control unit of the mobile electronic device can be configured to retrieve the illumination parameters, which are stored in the at least one data memory, from the data memory and to determine the predefined illumination image sequence on the basis of the retrieved illumination parameters. Typically, it is not until afterwards that the control unit activates the screen into displaying the illumination images of the thus determined predefined illumination image sequence and, synchronously with this, activates the camera into capturing the measurement images.

The mobile electronic device can comprise a user interface, with the aid of which the device can be operated, for example in order to carry out the suggested method. For example, the predefined illumination image sequence can be adjusted or at least influenced, for example by way of adjusting or changing at least one of the illumination parameters, via the user interface. Additionally, or alternatively, a selection between different (stored) predefined illumination image sequences can be rendered possible by way of the user interface, wherein the illumination image sequences differ from one another for example by way of one or more illumination parameters. Additionally, or alternatively, it is further possible for the type of the measured object which is to be examined to be inputted by way of the user interface. Apart from such an input, further inputs, for example a selection of characteristics of the respectively selected measured object which are of interest, can be rendered possible by way of the user interfaces. Apart from the definition of the illumination image sequence, the subsequent evaluation of the measurement image can also depend on such inputs via the user interface. For example, the inputs can also be taken into account by an evaluation unit of the system, as is described further below.

For example, one can envisage several different illumination image sequences or several different predefined sets of illumination parameters which each define one of the several measured images being predefined and, as described above, being stored in one or more of the mentioned data memories. The different predefined illumination image sequences or illumination parameter sets can be assigned for example to one of several different predefined (measurement) applications (for example defined by the respective measured object, the characteristic of interest and/or action recommendation). (Examples of different applications are specified further below). For example, one can envisage the user selecting (for example via the user interface of the mobile device) a specific application (for example from at least one application list which is displayed way of the user interface) and the control unit subsequently reading out the predefined illumination image sequence (or illumination parameter) which belongs to the selected application, from the data memory, in dependence on the selected application and subsequently carrying out the measurement with the read-out illumination image sequences (or with the read-out illumination parameters) as described. Additionally, or alternatively, it is possible for the evaluation of the measurement images to be dependent on the selected application.

The screen can be designed as a touchscreen and thus serve as the mentioned user interface of the device, for example via the representation of a graphic user surface with input fields which are represented on the touchscreen.

The user interface can moreover be configured to output a warning notice, for example if surrounding light influences are assessed as being too severe or if an implemented image registration of the measurement images or an object recognition cannot be successfully carried out, for example on account of the object characteristics or the user behaviour.

The user interface can comprise an acoustic output of the device which for example can produce the mentioned warning notices. The user interface can comprise a vibration module of the device which for example can produce the mentioned warning notices. Further user interfaces can be realised for example by way of further communicating devices with a display, such as for example smartwatches and head-mounted displays. The various modules, inasmuch as are present, can herein also be used in combination.

The at least one internal data memory of the device or an external data memory, for example of the mentioned further computer, can serve for the (intermediate) storing of the captured measurement images. Accordingly, the control unit can be configured to carry out or initiate a transfer of the captured measurement images onto this at least one data memory.

Furthermore, the control unit can be configured to activate the screen into displaying the captured measurement images, for example automatically after capturing the measurement images. For example, measurement results can be displayed on the screen of the device during or directly after the measurement, and for example a captured image of the measured object or a momentary live image of the camera can be superimposed on the screen in order to thus implement, for example, augmented reality techniques.

For example, an operating system of the device, such as for example iOS, Android, Windows, Linux, Blackberry OS or another operating system, as well as typically further application programs such as for example an Internet browser and/or an App store application can be installed on the at least one internal data memory of the device. For example, an (Internet) connection of the device to an App store, i.e. to an Internet-based digital marketing platform for application software, for example Apple's App Store or Google's Play Store, can be created via the App store application. In one embodiment example, the computer program product can be loaded as an app onto the internal data memory of the device via this App-Store application and is stored there for example permanently (e.g. until a deletion procedure which is initiated and/or confirmed by the user). A further possibility is to copy the computer program product or the app directly onto the device (e.g. per USB cable), in particular onto the smartphone, inasmuch as this is not blocked by the respective operating system. In a further embodiment example, the computer program product can be loaded into the internal memory of the device as a web app from an Internet page of a provider via the Internet browser of the device. The web app is for example temporarily (for example only for a predefined time duration or only for a predefined number of implementations of the method) stored on the internal memory and subsequently automatically deleted from the internal memory of the device. However, in all cases the computer program product is capable of running on the device and can be used by the user for carrying out the method, preferably directly after being loaded into the internal memory of the device.

The device typically comprises one or more cable-connected or preferably wireless data interfaces, such as for example at least one radio interface, in order to be able to connect the device for example to the Internet or to possible further components of the system, for example to one or more computer servers, for example via the Internet.

The mobile (portable) electronic device is as lightweight as possible in order to be comfortably held by the user (in particular during the aforementioned method steps, i.e. during the displaying of the illumination images and the capturing of the measurement images) with both hands or preferably with only one hand, aligned at a suitable position relative to the measured object. The device therefore preferably weighs less than 3 kg, less than 2 kg or less than 1 kg. A maximum edge length of the housing is typically not more than 30 cm, typically less than 25 cm or less than 20 cm. For example, the housing can be designed in an essentially cuboid manner. A minimum edge length is typically less than 5 cm, preferably less than 2 cm.

The camera as a rule comprises a lens, which is arranged at a front side of the casing and defines the observation region of the camera. The screen is then typically likewise arranged at the front side of the housing. The camera (at least the object of the camera) and the screen are typically arranged at the same side of the housing, which is to say are visible from the same side of the housing. The camera typically further comprises an image sensor, for example a light-sensitive semiconductor chip, such as for example a CCD or CMOS sensor or an InGaAs sensor.

The device can further comprise a loudspeaker or a microphone in order for example by way of a telephone application which is installed in the internal memory to permit telephone conversations via a mobile radio telephone network or via the Internet. The device can further comprise a (rechargeable) energy store for supplying the device with electrical energy, in particular the screen, the camera and the control unit of the device.

On carrying out the method by way of the system, the screen of the device emits light during the displaying of the illumination images. A measured object which is arranged in the observation region of the camera can thus be illuminated by way of the screen due to the fact that the screen faces the observation region of the camera. In so doing, the light from the screen which is emitted on displaying the illumination images reaches the measured object, is reflected at the measured object and is captured by the camera. Herein, the reflected light typically passes through the lens of the camera into the camera and is imaged on the image sensor of the camera.

The image sensor of the camera typically comprises a multitude of sensor units which are arranged in an overall grid. Each of the sensor units can comprise one or more sensor elements of the image sensor. For example, each sensor unit corresponds to an image point (pixel) of a measurement image which is captured by way of the camera. The positions of the sensor units and their sensor elements within the image sensor are defined by two sensor coordinates (XY) of the respective sensor unit.

Each of the measurement images therefore likewise comprise a multitude of image points (pixels) which are arranged in an overall grid and which are assigned to the sensor units of the image sensor and whose positions within the respective measurement image are defined by two image coordinates (XY) which typically correspond to the sensor coordinates of the respective sensor units. The measurement images further comprise image data in which image information is coded. For example, brightness values of the respective image points of the measurement images are coded in the image data. The brightness values of the image points of the measurement images are typically dependent on the charged or discharged state of light-sensitive sensor elements of the sensor units on capturing the respective measurement image.

Different measurement images comprise different information about the measured object due to the difference in the illumination images. For example, the illumination images can differ from one another by way of the spectral composition of the light which is emitted by the screen when they are displayed. Alternatively, or additionally, it is possible for the illumination images to be arranged in different regions of the screen, so that the measured object is illuminated from different directions seen from the camera.

It is therefore advantageously possible to obtain different information on the reflection characteristics or other characteristics of the measured object from the respectively captured measurement images. Furthermore, the information content of the measurement images can be very simply influenced by way of changing the illumination image sequence.

A further important advantage lies in the fact that the mobile electronic device can be for example a smartphone, a tablet computer (tablet), a laptop or a similarly widespread mobile electronic device. Advantageously, it is very simple for the user/consumer to configure such a commercially available device for carrying out the suggested method, for example simply by way of the user/consumer loading the suggested computer program product onto the device, for example from an app store or from a website of a provider of the computer program product, as described above. The system and the method are therefore very inexpensive compared to many conventional measuring devices, are configurable in a very variable manner via the illumination image sequence and the evaluation unit for data evaluation which is integrated into the mobile device, as described below, and can moreover be applied or carried out in a manner which is intuitive for many users. A further advantage over known systems is the fact that the mobile electronic device does not need to be retrofitted with further (external) optical hardware, neither for generating a dispersing optical effect, nor for the control of the specific parameters of the illumination and/or of the image capturing. The method which is described here can therefore advantageously be carried out without having to retrofit the device with further optical or electronic components. In particular, this method does not require retrofitting the mobile device with additional components, for example components such as filters, lenses, mirrors, apertures, screens, light sources, sensors etc. or to arrange such components between the mobile device and the measured object during the execution of the method.

Before capturing the measurement images, one can envisage pre-processing steps which can be automatically carried out by the camera being switched off or deactivated. For example, one can envisage an adjustment of a colour temperature of the captured images which is automatically carried out by the camera being switched off or the colour temperature being set for example at a fixed value and subsequently being taken into account on evaluating the measurement images. This respectively applies to automatic adjustments of other capturing/recording parameters of the camera, such as the sensitivity, exposure time, and white balance.

Accordingly, one can envisage an automatic brightness regulation of the screen (by the control unit) being switched off and the illumination being set for example to the highest possible brightness.

The screen of the mobile electronic device as a rule emits light primarily or exclusively in the visible spectral region, i.e. light with a wavelength between 400 nm and about 800 nm. The screen is typically a colour screen and therefore configured to display colour images. The screen can comprise for example several colour channels. The screen has a channel-specific spectral emission characteristic which is also indicated hereinafter as $D_d(\lambda)$, in each of the colour channels. The light which is emitted in a colour channel therefore has a spectral intensity distribution which is predefined for this colour channel and corresponds to a basic colour of the screen which can be represented with the screen. For example, the screen can comprise a red colour channel, a blue colour channel, and a green colour channel. The colours of the colour channels, thus for example red, green, and blue then represent the basic colours of the screen. The screen and the cameras are typically adapted to the human visual system. Visible light with wavelengths of up to approx. 485 nm is perceived as blue, of approx. 500 nm to approx. 550 nm as green and from approx. 630 nm as red. Accordingly, the red colour channel (predominantly) emits in a red wavelength region, the green channel (predominantly) in a green wavelength region and the blue colour channel of the screen light (predominantly) in a green wavelength region.

The screen typically comprises a multitude of light elements which are arranged in an overall grid of the screen and which form image points (pixels) of the screen and together fill a total image area of the screen. Each of the colour channels is then formed by a subset of the light elements of the screen, the spectral emission characteristics of said light elements corresponding to the channel-specific spectral emission characteristics of the respective colour channel. Each image point of the screen is formed for example by a group of adjacent light elements which belong to the different colour channels. The light elements of different colour channels which belong to a common image point are also called subpixels of the screen. The light elements of each colour channel are each arranged in a grid. The grids of the colour channels are spatially superimposed on one another and therefore form the overall grid of the image points of the screen.

The camera of the mobile electronic device is typically a colour camera which is therefore sensitive to light with wavelengths between about 400 nm and about 800 nm and comprises several different colour channels. The camera typically comprises a channel-specific sensitivity for each of the colour channels, said sensitivity hereinafter also being indicated as $C_c(\lambda)$. For example, the camera can have a red colour channel, a blue colour channel, and a green colour channel. In many cases, the wavelength regions of the colour channels of the camera in pairs largely (typically but not completely) correspond to the colour channels of the screen.

Each of the colour channels of the camera is formed by a subset of sensor elements of the image sensor, whose spectral sensitivities correspond to the channel-specific spectral sensitivity of the respective colour channel of the camera. Each sensor unit of the image sensor of the camera is formed for example by a group of adjacent colour channels of the image sensor which belong to the different colour channels of the camera. The sensor elements of each colour channel are therefore each arranged in a sub grid which extends over the image sensor. The sub grids of the sensor elements of the different colour channels mutually superimpose spatially and thus form the overall grid of the sensor units of the image sensor. For example, the sensor elements of the red colour channel are most sensitive to red light, the sensor elements of the green colour channel most sensitive to green light and the sensor elements of the blue colour channel most sensitive to blue light. Red light for example has a wavelength of about 605 nm or more, green light a wavelength of about 555 nm and blue light of about 450 nm or more. Further examples of wavelength regions for the different colours are specified above.

For example, the control unit of the mobile electronic device is configured to activate the screen of the mobile electronic device into displaying one or more or each of the illumination images of the predefined illumination image sequence by way of activating the light elements of only a single colour channel of the screen and by way of activating all activated light elements of this colour channel with a uniform brightness value which is predefined for this colour channel, or by way of activating the light elements of several colour channels and by way of activating all activated light elements with a uniform brightness value which is predefined for the respective colour channel, or by way of replacing the aforementioned uniform brightness values by a gradient. Instead of being activated with a uniform brightness value, the activated light elements of a given colour channel can be activated for example with different brightness values which differ from one another according to a gradient which is defined for this colour channel. The gradient of the respective colour channel can be for example a predefined vector which for example can be uniform (i.e. constant) across the complete screen. The brightness values of the light elements of this colour channel then uniformly increase along the direction of the gradient vector according to the magnitude of the gradient vector (or alternatively uniformly decrease).

The activating of the light elements of a colour channel can be effected for example by way of switching on these light elements or by way of an activating with a uniform brightness value which is larger than the smallest possible brightness value of the light elements. In order to achieve a bright as possible illumination of the measured object by way of the activated light elements, the respective uniform brightness value preferably corresponds to a maximally possible brightness value of the light elements.

Accordingly, the respective non-activated light elements of the remaining colour channels can be switched off or remain switched off or can each be activated with a smallest possible brightness value.

Activation with a uniform brightness value allows the respective illumination image to have a uniform colour, thus each image point of the screen to illuminate in this uniform colour, or, if the illumination image does not fill the entire screen, i.e. the entire image area of this screen, being switched off or illuminating with only the smallest possible brightness. In this manner, the measured object can be spatially illuminated with the light of a predefined spectral intensity distribution in a homogenous manner by the screen.

If, for example, only a single colour channel of the screen is activated, the screen illuminates uniformly in the respective basic colour of the screen, for example in red, green, or blue. For example, the illumination sequence can encompass a red illumination image, a green illumination image, and a blue illumination image or only one or two of these illumination images. The control unit is for example configured to activate the screen into displaying the red illumination image by way of activating the light elements of only the red colour channel of the screen and by way of activating all activated light elements of the red colour channel with a uniform brightness value which is predefined for the red colour channel, displaying the green illumination image by way of activating the light elements of only the green colour channel of the screen and by way of activating all activated light elements of the green colour channel with a uniform brightness value which is predefined for the green colour channel, and/or displaying the blue illumination image by way of activating the light elements of only the blue colour channel of the screen and by way of activating all activated light elements of the blue colour channel with a uniform brightness value which is predefined for the blue colour channel. The sequence of the illumination images can be arbitrary.

Uniform mixtures of the basic colours of the screen can be produced by way of activating several colour channels. One of the illumination images can be for example a white illumination image (hereinafter also called a white image), with regard to which all light elements of the screen are activated and activated with the largest possible brightness value. A further illumination image can be for example a black illumination image (hereinafter also called black image), with regard to which all light elements of the screen are switched off or deactivated or are activated with the smallest possible brightness value. The white illumination image and the black illumination image can be used for example for calibrating the remaining measurement images and for estimating surrounding light influences. The calibration which is based on certain maximum and minimum brightnesses, for taking surrounding light influences into account can be achieved for example via a linear function (shifting and scaling). It can also be achieved via a non-linear function, for example in order to emphasis dark regions in the image or to reduce bright regions in the image.

In order to define the illumination images, one or more of the following illumination parameters can for example be used:

spectral composition of the light which is emitted by the screen on displaying the respective illumination image and/or for each colour channel of the screen, a uniform brightness value and/or a screen region which is filled out by the respective illumination image, in particular the size and shape of the screen region, and/or an arrangement of a screen region which is filled out by the respective illumination image, within the total image area of the screen.

Each of the illumination images is typically continuous. For example, one, several, or each of the illumination images can completely fill out the total image area of the screen. However, it is also possible for one, more, or each of the illumination images to each fill out only a part-region of the total image area of the screen, wherein the screen is typically black outside the part-region which is filled out by the illumination image (i.e. light elements are switched off or are not activated, thus do not illuminate or only with the smallest possible brightness). The screen region which is respectively filled out by the illumination images corresponds for example to at least $\frac{1}{6}$, $\frac{1}{5}$, $\frac{1}{4}$, $\frac{1}{3}$, $\frac{1}{2}$, or more of the total image area of the screen. For example, the illumination image sequence can comprise R illumination images which each fill out roughly only 1/Rth of the total image area of the screen, wherein R for example is a natural number which is greater than 2 and for example smaller than 20. Typically, it lies between 3 and 10. For example R=3, 4, 5, or 6. Typically, the respectively filled-out part-regions of the illumination images do not mutually overlap on the screen.

The filled-out part-regions of the illumination images can be arranged at a same location within the total image area of the screen. The illumination images then however typically differ from one another at least in their colour. Alternatively, it is possible for the illumination images to not only differ in their colour, but also in their arrangement on the screen. Furthermore, it is possible for the illumination images to not differ in their colour but only in their arrangement on the screen.

For example, the image content of each one of the illumination images can be an area (which typically completely fills out the mentioned part-region) which is filled-out in a single-coloured manner, wherein the colour for example can be one of the basic colours (e.g. red, green, or blue) of the screen or white (all colour channels with the same, preferably maximum brightness) as has been described above.

If the illumination images have the same colour and only differ in their position on the screen, then the illumination images are typically areas (which completely fill out the respective part-regions) which are filled out in a single-coloured manner, wherein the colour for example in each case is the same basic colour (e.g. red, green or blue) of the screen or white (all colour channels with the same, preferably maximum brightness).

For example, the total image area of the screen can comprise an upper edge, a lower edge, a left edge, and a right edge, wherein the filled-out part-regions of the illumination images differ from one another in their distance from the upper edge of the total image area of the screen, wherein the lens is arranged above the upper edge of the total image area of the screen.

For example, the illumination image sequence can be defined by way of one or several of the following further illumination parameters:

total number of the illumination images, sequence of the illumination images, display duration of the illumination images, temporal interval between the displaying of the individual illumination images.

The total number of illumination images results for example from the number of colour channels of the camera and of the screen. If, for example, the latter both have three colour channels (for example red, green, and blue) which correspond to one another, then the illumination image sequence can comprise at least three illumination images, specifically one for each colour channel (red, green and blue). Additionally, the illumination image sequence can comprise the afore-described white image and the black image, so that the illumination image sequence then comprises for example (at least) five illumination images. The sequence can be set for example in an arbitrary manner. The display duration must be selected to be at least long enough for the image sensor to be adequately illuminated while capturing the measurement images. The display duration typically lies in a range between 10 ms and 500 ms, preferably in a range between 100 ms and 200 ms. The illumination images are typically displayed in a temporally successive manner and not simultaneously. The temporal interval between displaying of the individual illumination images typically lies in a range between 1 ms and 20 ms, preferably in a range between 5 ms and 10 ms. A total duration for capturing the measurement images therefore typically lies in a range between 60 ms and 3000 ms.

Each of the recorded measurement images comprises a multitude of image points as well as image data which are assigned to the respective image points. As has been described above, the system can comprise an evaluation unit which can be part of the device (for example as a logical or integrated unit of the processor of the device) or part of another component of the system (for example as a logical or integrated unit of the processor of this respective component), for example of a computer server.

For example, the evaluation unit is configured, for example by way of the computer program product, to merge the image points of the measurement images and to group the image data of merged image points into measurement data sets of the respectively merged image points. The merging of the image points is typically effected by way of an image registration of the measurement images. The merged image points then form a single registered measurement image and the image points of the registered measurement image comprise the respectively assigned measurement data sets.

The further processing of the recorded image data is preferably effected using of these measurement data sets. Instead of an individual, sequential evaluation of the individual measurement images, the evaluation can be effected across all measurement images and herewith simultaneously for all measurement images by way of the use of the describe measurement data sets. The measurement data sets which are obtained from the image data of the measurement images represent for example (hyper-)spectral data sets (further below also called spectral fingerprints) which are each assigned to a common location position in the measurement images and which contain the measurement data of several or of all measuring images which have been captured during an illumination image sequence. It is possible to process the measurement data in a spatially resolved manner by way of the use of the suggested measurement data sets (by way of the measurement data sets of the merged image points each being processed individually). Herein, each measurement data set can be understood as a measurement which is independent of the other measurement data sets and which depends on the local characteristics of the object in the object region which is respectively imaged by the measured data set. Depending on the resolution of the camera, a large number of independent measurements which are each represented by one of the measurement data sets can thus be produced by way of one-off implementation of the suggested measuring method. On account of the multitude of the measurement data sets which are produced with each measurement, the measurement data sets are particularly suitable as learning data for training algorithms of machine learning, such as for example of classification methods, for example of artificial neural networks. Accordingly, the measurement data sets are just as well suited for evaluation by way of such algorithms. The evaluation unit is preferably configured to evaluate the measurement data sets by way of an algorithm which is trained or trainable by way of a method of machine learning, such as for example a classification method, for example an artificial neural network. The data format of the measurement data sets is also predefined in a corresponding manner due to the fact that the illumination image sequence is predefined. In particular, by way of the definition of the illumination image sequence, one can determine beforehand which components of the measurement data sets belong to which illumination image (and hence for example to which wavelength region). Such a fixed assignment simplifies the further processing of the measurement data sets by way of predefined evaluation algorithms or calibrated models which typically demand a certain data format or are programmed for processing a certain data format.

Typically, image transformations of the measurement images, e.g. (local) coordinate transformations (rotations, translations, tilting and/or (local) rescaling, subpixel interpolation) are necessary for the image registration of the measurement images in order to compensate or subtract relative movements between the device and the measured object during the capturing of the measurement images. In the ideal case, a 1:1 correspondence exists between the image points of the measurement images, typically however a 1:X correspondence, wherein $X \neq 1$. When $X \neq 1$ the measurement values of the merged image points are typically interpolated or averaged in order to determine the measurement data sets.

For example, an object recognition algorithm can be carried out on the basis of the measurement images, preferably on the basis of the registered measurement image, in order to recognise those image points in the measurement image or in the registered measurement image which image the measured object. These image points are hereinafter called object image points. Each of these recognised object image points images a part-region on the surface of the object in the measurement image or in the registered measurement image. These part-regions are hereinafter called object points. For example, the object recognition algorithm can comprise a "region growing" algorithm. A first image point is defined at the beginning of this algorithm, of which image point it is assumed that it is an object image point. For example, an image point in the middle of one of the measurement images or of the registered measurement image can be defined as a first image point. Alternatively, the first image point can also be defined by the user via the user interface, for example, by way of marking a region on a measurement image which is displayed with the screen, or marking a displayed, registered measurement image, in particular if the screen is designed as a touchscreen. Subsequently, it is examined as to how greatly the measurement data sets of adjacent image points differ from the measurement data set of the first image point. It is only given an adequately low deviation that an adjacent image point is likewise classified as an object image point. This algorithm (starting from the object points which are each classified as new) is continued or iterated until no further image points are classified as object points.

If the screen and the camera have several colour channels and the illumination images differ in their colour, as has been described above, then each of the measurement data sets can be for example a so-called "spectral fingerprint" of the measured object in the associated object point of the measured object. If the screen has for example M colour channels and the camera for example N colour channels, then each of the measurement data sets can comprise for example M×N measurement values or more. For example, an illumination image can be displayed for each colour channel of the screen and a measurement image captured for each of these illumination images, wherein the brightness values which are measured in the individual colour channels of the camera are contained in the measurement data sets as individual measurement values. The (first) M×N measurement values of the measurement data set of an object point herein correspond for example to the different possible combinations of the colour channels of the screen with the colour channels of the camera. For example, it can be that M=3 and N=3 if the camera and the screen each comprise the colour channels red, green and blue. If the above-described white image and black image are additionally displayed and a measurement image captured in each case, then each measurement data set can comprise (M+2)×N measurement values.

The measurement data set which belongs to the object point of the measured object or to its object image point is hereinafter also called F(d, c) if the camera and the screen each comprise several colour channels. The index d describes the colours of the illumination images (or the colour channels of the screen) and can be defined for example numerically, and according to the above examples fulfil for example 1≤d≤M or 1≤d≤M+2, for example with M=3. Alternatively, the index d can also be defined by corresponding letters and, according to the above examples, for example fulfil d={r, g, b} or d={r, g, b, w, s}, wherein r, g, b stand for the red, green and blue colour channel of the screen or the respective red, green and blue illumination image respectively and w for the white image and s for the black image. Accordingly, the index c, which stands for the colour channels of the camera, can also be numerically defined and according to the above examples for example fulfil 1≤c≤N, for example with N=3. Alternatively, the index c can also be defined by way of corresponding letters and according to the above examples for example fulfil c={r, g, b}, wherein r, g, b stand for the red, green and blue colour channel of the camera respectively. For example, the measurement data which is contained in a measurement data set can be represented in the form of a table. For d={r, g, b, w, s} and c={r, g, b} for example as

TABLE 1

Example of components of a measurement data set F(d, c) for an object point of a measured object.

| | | Colours of the illumination images, d (colour channels of the screen) | | | | |
|---|---|---|---|---|---|---|
| | | r | g | B | s | w |
| Colour channels of the camera, c | r | F(r,r) | F(g,r) | F(b,r) | F(s,r) | F(w,r) |
| | g | F(r,g) | F(g,g) | F(b,g) | F(s,g) | F(w,g) |
| | b | F(r,b) | F(g,b) | F(b,b) | F(s,b) | F(w,b) |

For example, F(d, c) comprises the brightness value for the respective object point of the measured object, said brightness value being measured amid the illumination with an illumination image of the basic colour d by a sensor element of the colour channel c of the camera.

The measurement data sets of the individual image points however can also be total brightness values without colour information. For example, the measurement data set can be a so-called "gloss measurement vector" which is hereinafter also called G(a), wherein the index a represents the individual illumination images of the illumination image sequence.

For example, as described above, R illumination images can be provided, and these, as described above, each cover 1/Rth of the total screen area and typically do not mutually overlap. They differ in their position on the screen and taken together (if these were to be displayed simultaneously) cover the entire screen. The filled out part-regions of the illumination images differ from one another in their distances to the upper edge of the total image area of the screen, wherein the lens is arranged above the upper edge of the total image area of the screen. Furthermore, the illumination image sequence can comprise the white image and the black image which are already described above. The index a can then be defined for example numerically and fulfil for example 1≤a≤R or 1≤a≤R+2 (with white image and black image). The "gloss measurement vector" G(a) for R=3 for example has the following components:

TABLE 2

Example for components of a measurement data set G(a) for an object point of a measured object.

| | Illumination images, a | | | | |
|---|---|---|---|---|---|
| | 1 | 2 | 3 | 4 | 5 |
| Total brightness value | G(1) | G(2) | G(3) | G(4) | G(5) |

Typically, all colour channels of the screen in the respective part-regions are activated with the greatest possible brightness value, so that these illumination images appear white. For example, the gloss measurement vector G(a) comprises a total brightness value for each index a, said total brightness value having been measured under illumination with the illumination image with the index a, with all sensor elements of the camera in the respective object image point.

In principle, however, it is also possible for the illumination image sequence to comprise illumination images which differ from one another in the spectral composition or colour as well as, as described above, by the position a of the respectively filled-out part-regions. For example, the spectral fingerprint F(c, d) which is described above can be acquired for each position a, wherein the coloured illumination images only fill out the described part-region in this position a. In this manner, a measurement data set H(c, d, a) which comprises information on the spectral reflection characteristics as well as on the gloss of the measured object in the respective object point can be produced for each object point.

For example, information concerning the gloss characteristics of a measured object can be obtained by way of an evaluation of the gloss measurement vector G(a) as well as of the measurement data set H(c, d, a). Apart from many other possible examples, for example (human or animal) hair or a surface which is formed by many (human) hairs which lie next to one another can be considered as measured objects.

Hundreds, thousands or millions of measurement data sets of the measured object can be produced by way of capturing the measurement images during an illumination image sequence, depending on the number of image points or object image points in the measurement images.

For example, the evaluation unit can be configured to compare one, several or each of the measurement data sets, such as for example the afore-described spectral fingerprint F(c, d), the gloss measurement vector G(a) and/or the measurement data set H(c, d, a), with at least one predefined measurement data set. A result of this comparison can be for example a dimension value which measures how greatly the respective measurement data set differs from the respective reference data set. For example, the at least one reference data set can be defined in a feature space and the measurement data sets can first be transformed into this feature space by way of the evaluation unit before the comparison in order to subsequently carry out the comparison between the measuring data set and the reference data set in the feature space.

Given several reference data sets, one result can be the identification of the reference data set from which the respective measurement data set differs the least. For example, a ranking can be produced, wherein the less the respective measurement data set differs from the reference data set, the greater the rank which this reference data set obtains. A classification of the respective measurement data set can be effected by way of the evaluation unit by identifying the reference data set with the highest rank.

After comparing several or all measurement data sets with the (several) reference data sets, that reference data set which has come out on top of the described ranking and which, for example, has obtained the uppermost rank most often and thus has obtained the highest total rank (per "majority decision") can be identified. A classification of the measured object as a whole can be effected by way of the evaluation unit on account of this.

The identified reference data set with the highest total ranking can be outputted as a measurement result for example via a user interface, for example via the screen of the device. Instead of the identified reference data set with the highest total rank, one can also output a characteristic of the measured object which corresponds to this reference data set or a corresponding classification of the measured object in a corresponding manner.

A few embodiment examples of the invention relate to the type of gathering and storage of the recorded measurement values as well as their comparison with application-specific reference values. In some embodiments for example, no gathering and storing of the individual measurement data or measurement data sets (spectral signatures) and their direct comparison with the corresponding respective reference values (spectral signatures) from the data bank are carried out in the course of the application-specific embodiment of the evaluation unit. For example, a collective gathering and storage of characteristics features of the recorded measurement values, carried out over all measurement values, can be effected and for example a comparison of these characteristic features with characteristic features of the reference which are determined in the same manner can be carried out via an application-specific weighting, for example in the synaptic elements of an artificial neural network or comparable modules of other methods of machine learning, such as for example classifications methods. The model-based analysis is more that the simple comparison with reference patterns, but instead the result of a systematic and comprehensive measuring campaign which is carried out for the specific case of application and which covers the expected typical fluctuation of measurement signals in an application domain and constructs an implicit model which derives a decision from the measurement values.

The evaluation unit can be configured to carry out the afore-described comparison between the measurement data sets and the reference data sets by way of an—accordingly trained or optimised—artificial neural network. The described classification of the measurement data sets and of the measured object as a whole, in this case can be effected for example by way of a mathematical classification model on the basis of this artificial neural network. The artificial neural network can be a multi-layer peceptron for example, which can have for example two layers or more than two layers, in particular hidden (inner) layers.

For example, the mapping of the mathematical relation between the recorded measurement data and application-relevant information, said mapping being necessary for solving the measuring task, is therefore not effected in a fixed manner on the basis of the solution of a predefined equation system, but in an application-specific manner on the basis of a freely configurable and parameterised algorithm, preferably from the field of machine-learning.

The artificial neural network can be trained by way of training cases. For example, given a monitored learning method, a multitude of training cases can each be given by an input vector and an output vector. The afore-described measurement data sets of measurement images of a known measured object which have been produced with the suggested method and whose characteristic characteristics have been determined for example in accordance with the afore-described approach can serve as input vectors. Typically, the characteristic characteristics cannot be derived from a single measurement data set, but are determined as a generalisation of the characteristics of many measurement data sets, which is to say they are determined implicitly. Measurement values which have been obtained independently of the measurement images and which characterise certain characteristics of the measured object which are of interest (for example chemical composition, degree of maturity, gloss characteristics or other characteristics of the measured object which are of interest) can serve as output vectors. The artificial neural network (i.e. its parameters) is subsequently optimised for these training cases, for example by way of an error feedback (back propagation). Further details concerning such techniques can be derived for example from the following academic books:

R. Rojas: Theory of neural networks: A systematic introduction, Springer, 1996
R. Brause: Neuronal networks: An introduction into neuroinformatics, Teubner, 1995
J. Lunze Artificial intelligence for engineers, Oldenbourg 2010

The predefined at least one reference data set can be stored for example in a data memory, for example in the internal data memory of the mobile electronic device or another component of the system, for example of a computer server or a cloud. The evaluation unit can be configured to automatically access this data memory and to retrieve the reference data sets from the data memory in order to be able to carry out the described comparison. For example, the evaluation unit can be configured to carry out the request of the reference data sets in dependence on an input via the user interface. For example, one can envisage inputting the type of measured object which is to be examined and which characteristics of this measured object are to be examined, by way of the user interface The evaluation unit can be configured to take into account, in evaluating the measurement data sets, the spectral sensitivity $C_c(\lambda)$ of the camera or the spectral emission characteristics $D_d(\lambda)$ of the screen or both. (The indices c and d are defined as described above). In this manner, it is possible for example to improve the comparability of the measurement data sets which have been obtained by way of different screens and cameras, in particular the comparability of the afore-described spectral fingerprint F(d, c) or of the gloss measurement vector G(a). The spectral sensitivity $C_c(\lambda)$ of the camera and the spectral emission characteristics $D_d(\lambda)$ of the screen can be measured for example by way of a spectrometer or derived from the respective manufacturer specifications.

Additionally, or alternatively to the evaluation which is described above, the evaluation unit can be configured to determine a reflection characteristics of the measured object from the measurement data sets whilst taking into account the spectral sensitivity $C_c(\lambda)$ of the camera and the spectral emission characteristics $D_d(\lambda)$ of the screen. Concerning the mentioned reflection characteristic, this for example can be the reflection spectrum of the measured object (in the respective object points) which measures the dependence of the reflection degree of the measured object (in the respective object points) on the wavelength of the light. The determined reflection spectrum in many cases permits information on the (bio-)chemical composition of the measured object (at least on its surface) or characteristics of the measured object which correlate with this.

Generally, the relationship between the measured "spectral fingerprint" F(d, c) of the measured object in an object point and the actual (unknown) reflection spectrum $S(\lambda)$ of the measured object which is of interest, in this object point, can be mathematically described as an integral over the complete wavelength region:

$$F(d,c)=\int D_d(\lambda)C_c(\lambda)S(\lambda)d\lambda. \qquad \text{Equation (1)}$$

The spectral emission characteristic $D_d(\lambda)$ with d={r, g, b, w, s} of the screen and the spectral sensitivity $C_c(\lambda)$ of the camera c={r, g, b} are defined as described above. Spectral channels $S^k$ as average values over the respective wavelength region $[A_k, A_{k+1}]$ between the wavelengths $A_k$ and $A_{k+1}$ can be defined by $\Delta A = A_{k+1} - A_k$:

$$S^k = \frac{1}{\Delta A}\int_{A_k}^{A_{k+1}} S(\lambda)d\lambda \qquad \text{Equation (2)}$$

The components of the spectral fingerprint F(d, c) can then be seen approximately as the sum over the spectral channels $S^k$, thus as:

$$F(d,C)=\Sigma_k S^k B_{dc}^k \qquad \text{Equation (3)}$$

with the coefficients which are specific to the respective device $$B_{dc}^k = \frac{1}{\Delta A}\int_{A_k}^{A_{k+1}} D_d(\lambda)C_c(\lambda)d\lambda \qquad \text{Equation (4)}$$

The spectral channels $S^k$ are not (or only relatively weakly) dependent on the device-specific variables $D_d(\lambda)$ and $C_c(\lambda)$ and therefore particularly well suited for an application across all types of device. The spectral channels $S^k$ typically encompass the entire spectral wavelength region of the display and of the camera. With known device-specific variables $D_d(\lambda)$ and $C_c(\lambda)$ and given a measurement of the spectral fingerprint F(d, c) results in an equation system (Equation 3) with the spectral channels $S^k$ as the unknown. If the equation system is adequately linearly independent, then it can be solved and one obtains the sought spectral channels $S^k$. The number and position of the spectral channels $S^k$ can be suitably selected for this. If the number of spectral channels $S^k$ is selected too high, then the equation system is however no longer adequately linearly independent. In some applications, for example with commercially available smartphones, the equation system can solve $S^k$ in many cases given a number of for example 5 to 6 channels. In some cases, a higher number of channels $S^k$ can be achieved whilst utilising non-linear effects. The possible number and position of the channels $S^k$ for the respective device which can be calculated as a rule depend on the differences between the device-specific variables $D_d(\lambda)$ and $C_c(\lambda)$ and on noise influences. In some cases, for example 15 channels $S^k$ can also be realised.

The reflection spectrum $S(\lambda)$ which is determined in the manner described above is an approximation with a limited accuracy. Despite this, useful applications can be implemented by way of this.

Alternatively, or additionally to the spectral channels $S^k$, the mentioned reflection characteristics can for example also be or comprise the dependency of the reflection degree of the measured object (in the respective object points) on the angle of incidence of the light upon the measured object (in the restive object points). The angular-dependent reflection degree in many cases allows for objective inferences on the gloss of the surface, thus on the share of the light which is reflected in a directed manner on the surface of the measured object (as opposed to diffusely reflected light). For example, this angle-dependent reflection degree can be determined on the basis of the afore-described gloss measurement vector G(a) or of the measurement data set H(c,d,a) for each object point or be estimated quantitatively. Given a very shiny surface, the angle-dependent reflection of the surface typically displays a particularly high and narrow intensity maximum when the exit angle of the measured reflected beam path corresponds precisely to the angle of incidence of the incident beam. For example, a histogram on the brightness of the individual pixels can be computed. For example, a dimension value for the reflection in relation to the angle (corresponding to the currently illuminated part of the screen) can be computed on the basis of the histogram or its characteristics, for example via threshold values or an analysis of the histogram.

As has already been described beforehand in the context of the measurement data sets, in particular in the context of the spectral fingerprint F(c, d), the gloss factor G(a) and the measurement data set H(c,d,a), the evaluation unit can additionally or alternatively be configured to compare the determined reflection characteristics of the measured object, thus for example the spectral channels $S^k$ or the determined values for the angle-dependent reflection degree, with at least one predefined reference reflection characteristic.

Against the background of device-dependent variations of the characteristics in particular of the screen and of the camera of the mobile device (e.g. smartphone), wherein such variations, although being very low cannot however be completely ruled out, for example a device-specific calibration may be carried out in order to increase the measurement accuracy. A one-off or repeated measurement of a known calibration normal which is preferably characterised by a low as possible variation of its material and thus spectral characteristics can be carried out with the mobile device (e.g. smartphone). For the measurement, the measuring method which is suggested here is carried out with the mobile device and the described measurement images of the calibration normal are produced in this manner. A comparison of the measurement data which is obtained by the measurement, for example in the form of the afore-described measurement data sets, of the afore-described reflection characteristics or spectral channels $S^k$, with a corresponding reference data set of this calibration normal which is stored for example in the evaluation unit or in the internal data memory of the mobile device can subsequently be effected. This reference data set for example has been determined beforehand by way of highly precise methods using of one or more calibration normals. For example, the values for the device-specific variables $D_d(\lambda)$ and $C_c(\lambda)$ can be computed afresh on the basis of a comparison of the measurement data for the spectral channels $S^k$ with corresponding reference values of the spectral channels $S^k$ and be stored for use in future measurements. For example, the control unit and/or the evaluation unit of the mobile device can be configured to automatically carry out the new computation of the variables $D_d(\lambda)$ and $C_c(\lambda)$ which is necessary for the calibration, for example in a previously activated (for example by the user via the user interface) calibration mode of the device.

Commercially available and specially calibrated/characteristics calibration normals, for example of spectrally particularly constant material (PTFE, Teflon) can be used for the design of the aforementioned calibration normal. A further design possibility, in particular with regard to the preferred use by the consumer and the intended avoidance of addition hardware with the costs which are entailed by this, lies in the use of generally easily accessible and less variable objects indeed with another application purpose, such as banknotes, as a calibration normal.

If one assumes that the aforementioned device-dependent variations of the characteristics, in particular of the screen and the camera, of the mobile device (e.g. smartphone) do not change during the normal life duration and service life of the device, this device-specific calibration is typically only necessary once. In cases of greater device-dependent variations of the characteristics, in particular of the screen and the camera, of the mobile device (e.g. due to excessive wear), this calibration can basically be repeated as often as desired in order to take into account the occurring variation. Such variations can be reduced by way of the suggested calibration. This is particularly advantageous in the case of smartphones and comparable mobile devices for consumers, since such devices often differ in the emission behaviour of the display as well as in the filter characteristics of the colour camera and these characteristics can often only be acquired directly with measuring technology with a lot of effort.

Different applications result for the system, the method and the computer program, of which applications some are listed by way of example and sorted according to application complexes. What are listed are examples for measured objects, examples for possible characteristics of the respective measured objects which are of interest as well as examples for recommendations for action.

Application Complex 1:
Human—Medicine:
  skin type
  hair type
  hair colour
  discolouration (moles, melanomas)
  wound healing, colour of inflammation
  recognising, objectively assessing and/or documenting disease (e.g. metabolic disease, infections, allergies) and/or appearances of deficiencies on the basis of a specific change in the hair or skin (or fur with animals). Automatic or semi-automatic (in the context of an assistance system) deductions of recommendations for action which are based on this, for example for the treatment of the respective disease, for the treatment of the deficiency symptoms, for optimising nutrition or for optimising the care of the skin and/or hair (or fur in the case of animals). For example, care products (such as for example lotions, shampoo, etc.) or certain foodstuffs (such as for example so-called "functional foods", fruit, artificially manufactured foodstuff supplement products, etc.) or certain food ingredients (e.g. vitamins, minerals, etc.) can be recommended for example in an automatic or semi-automatic manner for optimising the nutrition or care.

Human—Cosmetics (Recommendation of Care Products and Behaviours):
  skin type, skin colour (general)
  selection of cosmetics
  selection of sun protection
  selection of dyes
  selection of care products
  skin colour (current)
  tanning degree
  hair colour (current)
  new colouring, colouring necessary?
Pets and Livestock
  skin, fur
  care products
  health
Application Complex 2:
Production and Processing of Vegetable Products:
  recognising the health and nutrition condition of cultivated plants in vivo in field crops, greenhouses and laboratories (all types of biotic and abiotic stress)
  recognising weeds and undesirable plants within the framework of agricultural production in field crops
  determining quality parameters of harvest directly on/after harvesting as well as on storage, sale and further processing
  recognising undesirable products|objects|contamination-|fungicidal and pest infestation in the harvest directly on/after the harvesting, as well as on storage, sales and further processing
  determining quantity parameters of seeds within the framework of plant cultivation (selection) or seed production (quality assurance)
Application Complex 3:
Determining characteristics of textiles such a leather, fur, materials of natural or artificial origin:
  colour
  texture
  composition
  origin
  age
  cleanliness
  colour nuances, style counselling (what textiles match when)
Application Complex 4:
Determining characteristics of foodstuffs (fruit, vegetables, fish, meat, mushrooms, dairy products, processed products)
  shelf life
  freshness, age, maturity
  purity, composition
  variety
  processing degree
  treatment or non-treatment Concerning the described application examples, the measurement images of the respective mentioned object are captured for example by way of the suggested system and these are subsequently evaluated by way of the system. The information which is of interest in each case, such as for example certain characteristics of the object or information which is derivable from this, is determined by the system, for example by the evaluation unit of the mobile device. For example, respective action recommendations can be subsequently determined on the basis of the thus determined information (from the determined characteristics of the object and/or from the information which is derived from this). The determined information and/or the determined action recommendations can be outputted to the user via the mobile device, for example optically by way of the display of the mobile device and/or acoustically by way of a loudspeaker of the mobile device. For example, one can envisage the user undertaking an input via the user interface of the mobile device before carrying out the measurement, with which input the type of measured object, the type of information which is of interest and/or the type of action recommendations are specified. As has already been described above, the illumination parameters of the illumination image sequence as well as the evaluation of the measurement images can be dependent on this input.

With the system and the method which are suggested here, a user can carry out measurements on an object and obtain information of characteristics of an object which are of interest and potentially also action recommendations, in a simple manner by way of a generally available mobile device, for example by way of a smartphone. In many of the embodiments examples which are described here, the system or the method is a combination of a mobile device, systematic data gathering, machine learning and model-based application specific recognition. By way of this combination, the system is also in the position of learning expert knowledge (e.g. knowledge of a doctor) by way of the system for example learning which specific action recommendations can be derived from which characteristics. By way of this, the system in some cases can render the user independent of experts and furthermore can also be used in constellations which previously did not exist.

Figure 2:
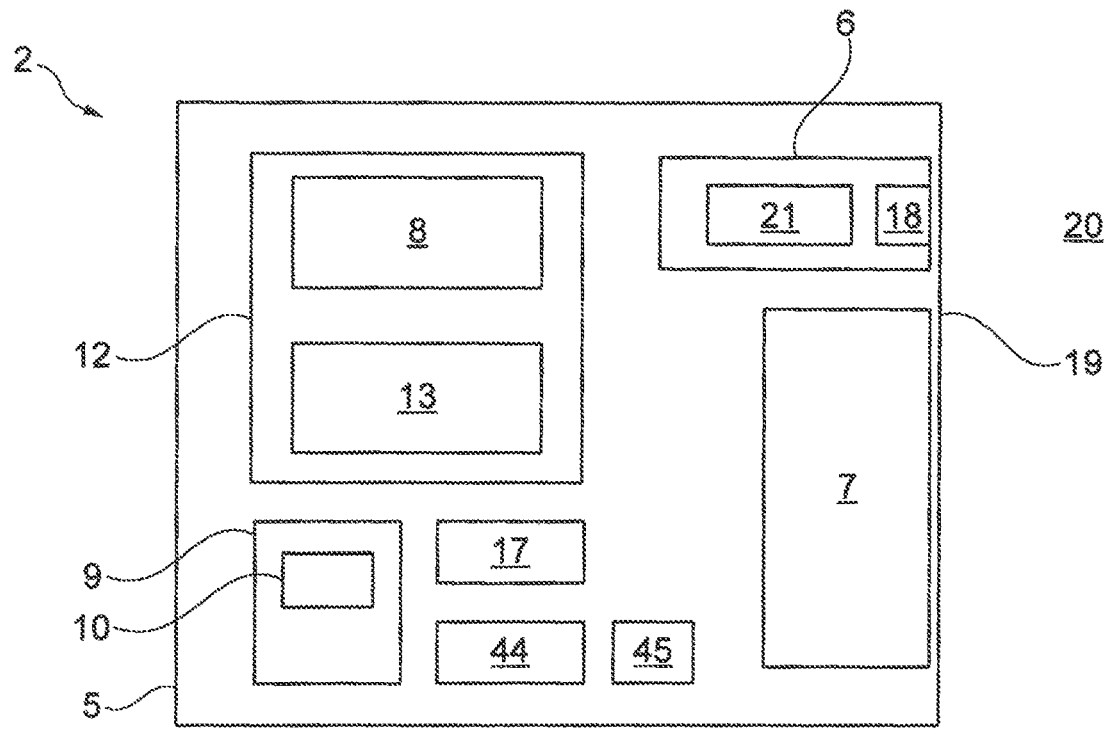
Figure 4:
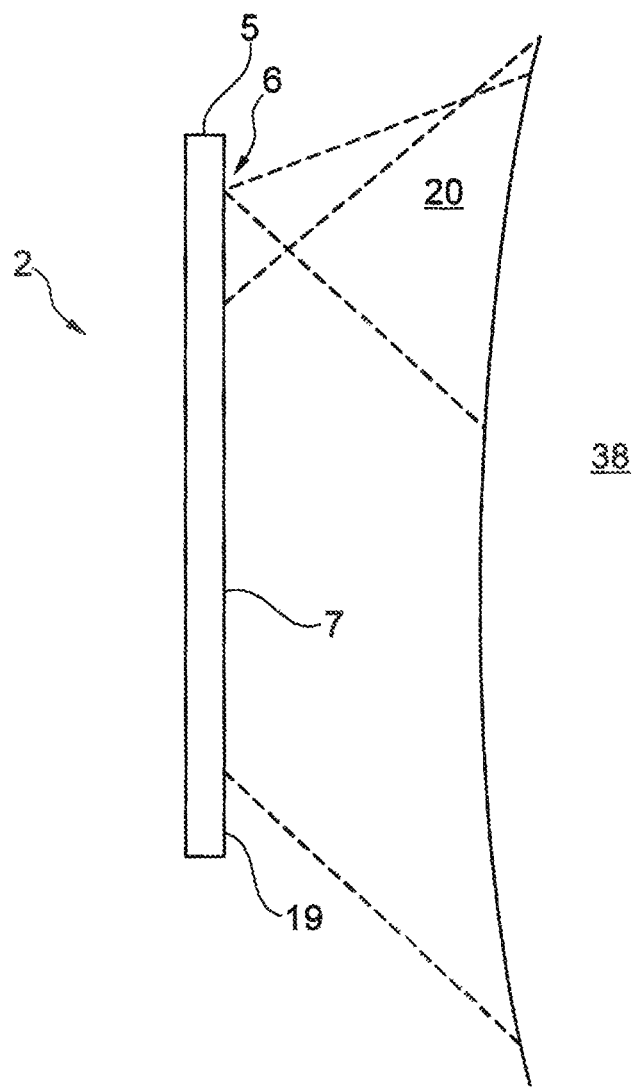
Figure 6A:
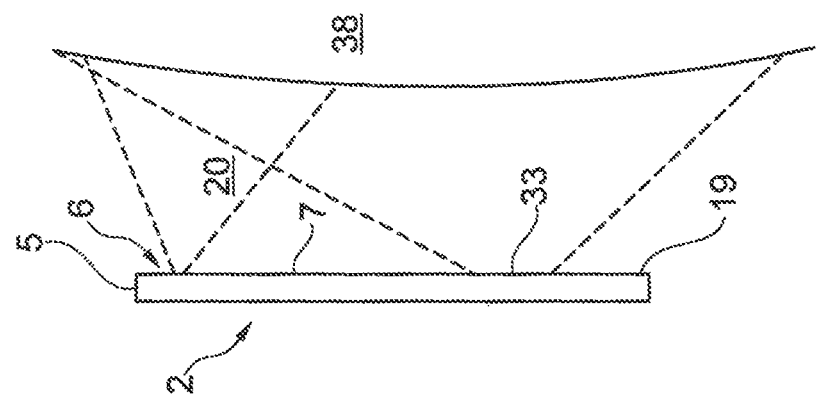
Figure 6B:
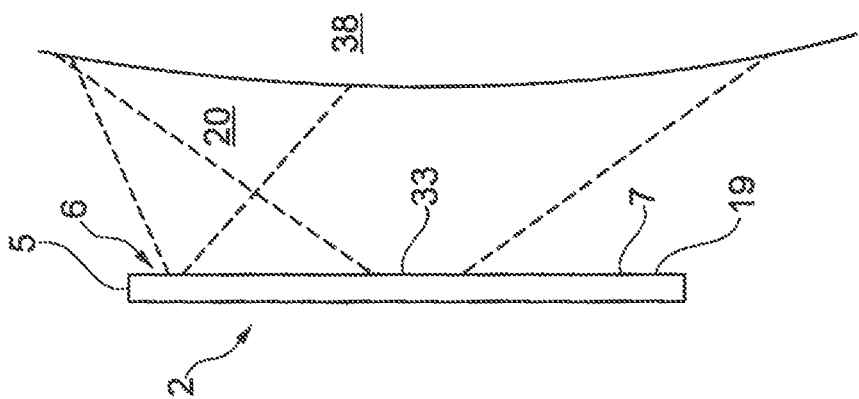
Figure 6C:
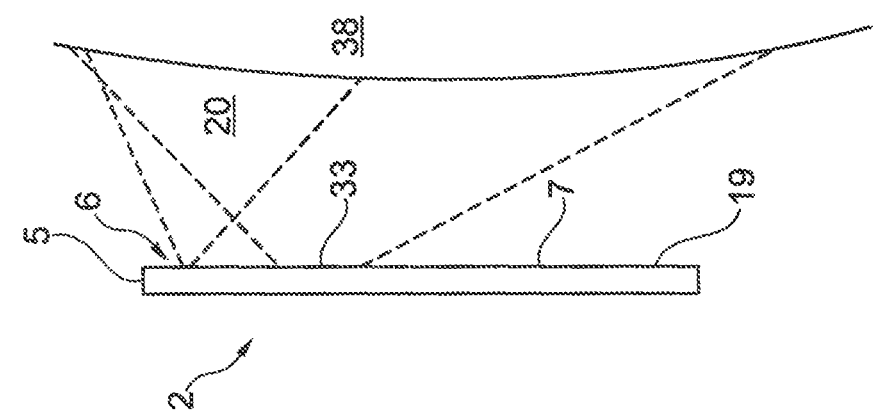
Figure 7:
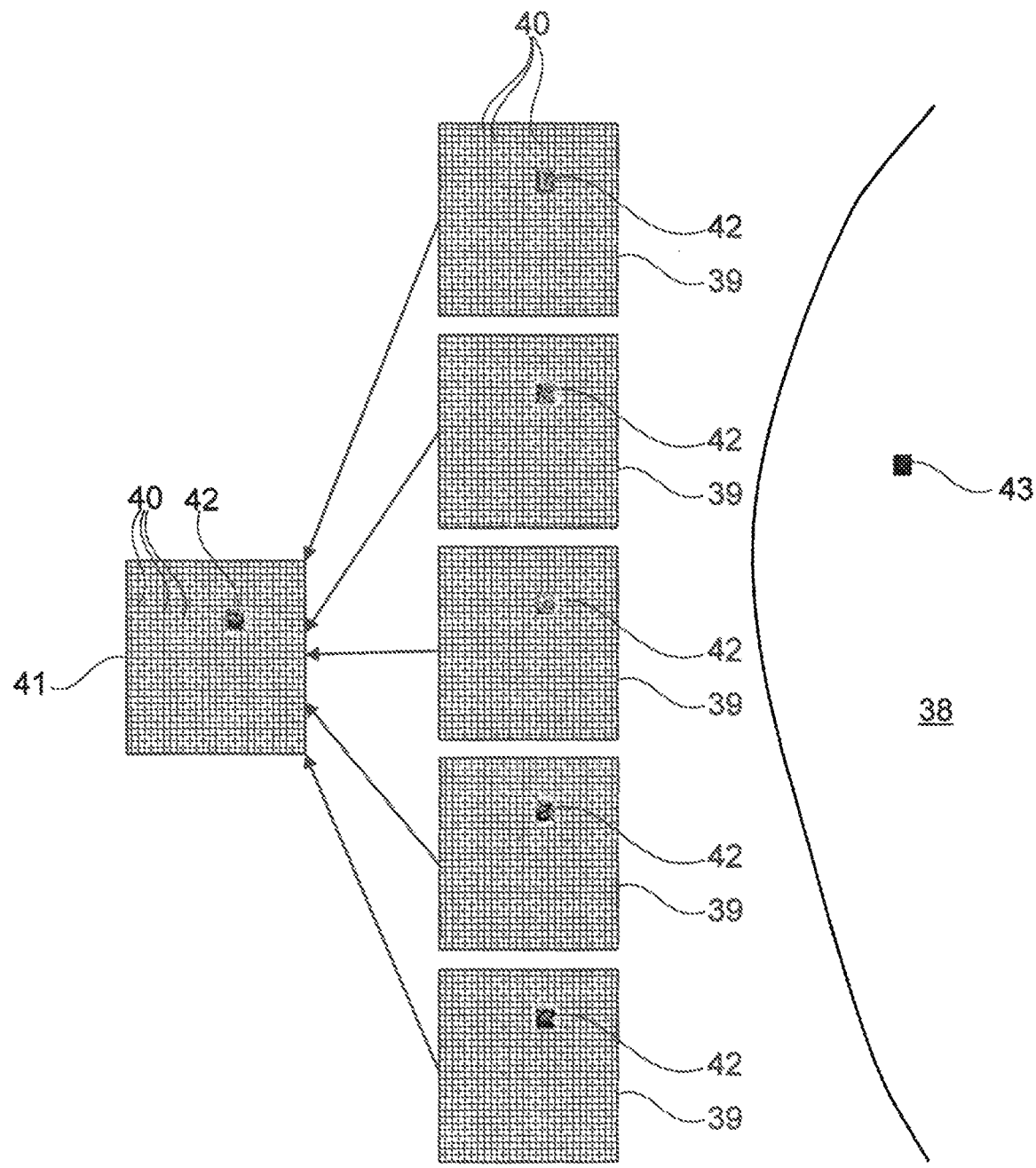
Figure 8:
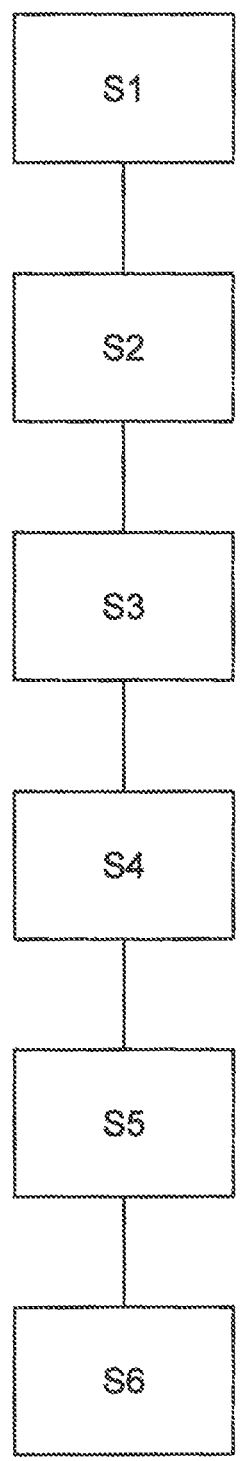

The invention is hereinafter explained in more detail by way of special embodiment examples which are schematically represented in FIGS. 1 to 8. There are shown in:

FIG. 1 a system of the type suggested here,

FIG. 2 a mobile electronic device of the system which is shown in FIG. 1,

FIGS. 3A-3E the mobile electronic device of the system which is shown in FIG. 1, in a view from the front, each displaying a different illumination image of the first illumination image sequence, FIG. 4 the mobile electronic device of the system which is shown in FIG. 1, in a lateral view, displaying an illumination image of the first illumination image sequence, and a measured object, FIGS. 5A-5E the mobile electronic device of the system which is shown in FIG. 1, in a view from the front, each displaying a different illumination image of a second illumination image sequence, FIGS. 6A-6C the mobile electronic device of the system which is shown in FIG. 1, in a lateral view, each displaying a different illumination image of the first illumination image sequence, and a measured object, FIG. 7 a schematic representation of several measurement images which have been captured from a measured object by the device of the system which is shown in FIG. 1, and FIG. 8 a flow diagram with steps of a method of the type suggested here.

Identical features or ones which correspond to one another are provided with the same reference numerals in the figures.

FIG. 1 shows a system 1 of the type which is suggested here, for capturing and evaluating measurement images of a measured object. The system 1 comprises several mobile electronic devices 2, of which only one is represented in FIG. 1 for the purpose of a better overview. The system 1 in this example further comprises several computers 3 such as for example computer servers or PCs or a cloud, of which likewise only one is represented. The subsequent description can relate to each of the devices 2 or computers 3, although only speaks the device 2 or the computer 3 are mentioned.

In the shown example, the device 2 and the computer 3 are connected to one another via a computer network 4, for example via the Internet and/or a cloud. In another embodiment, the system comprises no further computers 3.

The device 2 can be for example a smartphone, for example an iPhone of the manufacturer Apple. However, the device 2 could also be a smartphone of another manufacturer or another mobile electronic device, for example a tablet computer.

The device comprises a housing 5 and a camera 6 which is integrated in the housing 5, for capturing measurement images of a measured object within an observation region of the camera 6. The device further comprises a screen 7 which is integrated in the housing 4, for the light-emitting displaying of images. The screen 7 faces the observation region of the camera 6.

FIG. 2 shows a further schematised representation of the device 2, in which a few of the components of the device 2 are shown. The device 2 comprises a control unit 8 which is integrated in the housing and which is configured to activate the screen 6 into successively displaying several different illumination images of a predefined illumination image sequence. The control unit 8 is furthermore configured to activate the camera 6 into capturing a measurement image of the measured object synchronously with the displaying of each illumination image of the predefined illumination image sequence.

The device 2 comprises an Internet data memory 9, which is integrated into the housing 4 of the device 2. The Internet data memory 9 comprises for example a volatile and a non-volatile data memory, for example a RAM and a ROM, for example in the form of one or more solid state drives.

A computer program product 10 which comprises software code sections is loaded onto the device 2. Instructions which can be carried out by the control unit are contained in the software code sections. On carrying out these instructions, the control unit carries out the afore-described control of the screen 6 and of the camera 5 as well as further steps which are described hereinafter, when the computer program product runs on the device 2.

The computer program product 9 is a computer program which is stored on the data memory 9. This computer program is also stored on a data memory 11 of the computer 3, for example on a hard disc of the computer 3 or a cloud memory and has been loaded for example from the computer 3 onto the device 2 via the computer network 4.

The control unit 8 is a (logical or integrated) unit of a (digital) processor 12, for example a main processor (CPU) of the device 2 in the form of an electronic circuit which is realised for example as a semiconductor chip. The processor 12 is connected to the data memory 9 of the device 2 in order to access the data memory 9 and in particular to retrieve the computer program product which is loaded into the data memory 9 or its loaded software code sections and to subsequently (as a control unit 8 of the device) carry out the aforementioned steps (synchronous activating of the screen 7 and the camera 6) as well as further subsequently described steps.

The device 2 further comprises an evaluation unit 13 which is likewise a (logical or integrated) unit of a (digital) processor 12. The evaluation unit 13 is configured to carry out method steps for evaluating measurement images. The computer program product comprises further software code sections in which corresponding instructions are coded, these being able to be carried out by way of the processor 12 of the device, so that the processor 12 functions as the mentioned evaluation unit 13 of the device 2 on carrying out these further instructions.

For example, the method can be carried out completely by the device 2 in order to thus minimise the transmitted data volume, so as to not be reliant on a data connection and/or to protect sensitive data. In principle, it is additionally or alternatively also possible for corresponding evaluation steps to be carried out for example by way of the computer 3. For this, the computer can (likewise) comprise an accordingly configured evaluation unit 14, which can likewise be a (logical or integrated) unit of a processor 15 of the computer 3. It is also possible for the evaluation of the measurement images to be partly carried out by the evaluation unit 13 of the device and partly by the evaluation unit 14 of the computer 3.

The predefined illumination image sequence in this example is completely defined by a set of illumination parameters which are described in more detail further below. The illumination parameters are stored on the data memory 9 of the mobile electronic device 2 as well as on the data memory 11 of the computer 3. For example, the software code of the computer program product 10 comprises definitions and values of the illumination parameters. For example, an automatic storage of the illumination parameters on the data memory 9 of the device 2 is effected by way of loading the computer program product 10 onto the device 2. On carrying out the afore-described method steps, the control unit 8 retrieves the stored illumination parameters from the data memory 9 of the device 2 (or alternatively from the data memory 11 of the computer), subsequently determines the predefined illumination image sequence on the basis of the retrieved illumination parameters and subsequently activates the screen 7 into displaying the illumination images of the predefined illumination sequence which is determined in this manner, and synchronously with this, the camera 6 into recording the measurement images.

The screen 7 of the device 2 is a touchscreen which functions as a user interface 16 of the device. The user interface 16 in particular permits the operation of the device for carrying out the suggested method. For example, the predefined illumination image sequence can be set in a direct or indirect manner via the user interface 16. For example, a selection between different (stored) predefined illumination image sequences is rendered possible by way of the user interface 16. This can be effected by way of the user interface 16, for example by way of the type of measured object to be examined being inputted and a selection of one or more characteristics of interest of the selected measured object being made. Depending on these inputs, the control unit 8 for example determines the illumination images of the illumination image sequence and the evaluation unit 13 for example determines the type of evaluation. The user interface moreover comprises for example an acoustic output of the device 2, for example in the form of an installed loudspeaker and/or a vibration module, for example for producing warning signals, for example i environmental light influences are assessed as being too great or if an implemented image registration of the measurement images or an object recognition could not be carried out successfully, for example due to the object characteristics or the user behaviour.

The data a memory 9 of the device 2 is configured for storing the captured measurement images. For this, the control unit 8 transfers the captured measurement images to the data memory 9 and initiates the storage. For example, the evaluation unit 13 of the device can access the measurement images which are stored in the data memory 9 in order to carry out the evaluation. Furthermore, the control unit 8 can activate the screen 7 for example into automatically displaying one or more of the captured measurement images after the capturing of the measurement images. Basically, it is additionally or alternatively also possible for the measurement images to be transferred to the computer 3, to be stored there in the data memory 11 and to be evaluated by way of the evaluation unit 14.

Furthermore, an operating system of the device 2, such as iOS, as well as further application programs, in particular an Internet browser and an App-Store application are installed on the data memory 9 of the device 2. An (Internet) connection of the device 2 to an App-Store can be created via the App-Store application. The computer program product 10, for example as an app, can be loaded from the data memory 11 of the computer 3 onto the data memory 11 of the device 2 via this App-Store application and is permanently stored there. However, it is alternatively possible for the computer program product 10 to be loaded from the data memory 11 of the computer 3 onto the data memory 9 of the device as a web-App via the Internet browser of the device 2 from an Internet page of a provider. The computer program is then for example temporarily stored on the data memory 9 for carrying out the method and is subsequently automatically deleted again.

The device comprises several (wireless) data interface locations 17, such as for example a radio interface, in order to be able to connect the device to the Internet.

The mobile (portable) electronic device 2 is small and lightweight, so that it can be aligned and held by the user in at suitable position relative to the measured object with only one hand during the display of the illumination images and the capturing of the measurement images. The device therefore preferably weights less than 1 kg, for example about 200 g. A maximum edge length of the roughly cuboid housing 5 is for example less than 20 cm, for example about 16 cm, and a minimum edge length is for example less than 1 cm. for example about 8 mm.

The camera 6 of the device comprises a lens 18 which is arranged on a front side 19 of the housing 5 and defines the observation region 20 of the camera 6. The camera 5 comprises an image sensor 21, for example a light-sensitive semiconductor chip such as for example a CCD sensor or CMOS sensor or an InGaAs sensor. The image sensor 21 comprises a multitude of sensor units (not represented) which are arranged in an overall grid. Each of the sensor units comprises several adjacent light-sensitive sensor elements (not represented) of the image sensor 21 which belong to different colour channels of the camera 6. Each sensor unit corresponds to an image point (pixel) of a measured image which is captured by way of the camera 6. The positions of the sensor units and their sensor elements within the image sensor are defined by two sensor coordinates (XY) of the respective sensor unit.

The camera 5 is sensitive to light with wavelengths between about 400 nm and about 800 nm and comprises a red, a green, and a blue colour channel. The camera has a channel-specific spectral sensitivity $C_c(\lambda)$ for each of the colour channels. Each of the colour channels of the camera is formed by a subset of sensor elements of the image sensor 21, whose spectral sensitivities correspond to the channel-specific spectral sensitivities of the respective colour channel of the camera. The sensor elements of each colour channel are therefore each arranged in a sub grid which extends over the image sensor 21. The sub grids of the sensor elements of the different colour channels are spatially superimposed on one another and thus form the overall grid of the sensor units of the image sensor 21.

The screen 7 is likewise arranged on the front side 19 of the housing 5 and emits light in the visible spectral region between 400 nm and about 800 nm. The screen 7 as the camera 6 comprises a red, a green and a blue colour channel. The screen 7 has a spectral emission characteristic $D_d(\lambda)$ in each of the colour channels, said characteristic corresponding to the basic colours red, green and blue of the screen 7. The screen 7 comprises a multitude of light elements (not represented) which are arranged in an overall grid of the screen 7 and which form the image points (pixels) of the screen 7 and together fill a total image area 22 of the screen 7. Each of the colour channels is formed by a subset of the light elements of the screen, whose spectral emission characteristics correspond to the channel-specific spectral emission characteristics of the respective colour channel. Each image point of the screen is formed by a group of adjacent light elements which belong to the different colour channels.

Apart from a loudspeaker or a microphone (both not represented), for example for telephone applications, the device further comprises a rechargeable energy store 45 for supplying the components of the device 2 with electrical energy.

The electronic device of the system 1 which is shown in FIG. 1 is shown in a view from the front in the FIGS. 3A to 3E, wherein an illumination image of a first predefined illumination image sequence is displayed by way of the screen 7 in each case. In the shown example, this first illumination image sequence comprises: a red illumination image 23, a green illumination image 24, a blue illumination image 25 and a white illumination image 26 (white image). Furthermore, a black illumination image 27 (black image) is displayed.

The control unit 8 of the mobile electronic device 2 is configured to activate the screen 7 of the mobile electronic device 2 into displaying the red illumination image 23 by way of an activating of the light elements of only the red colour channel of the screen 7 and by way of an activating of all activated light elements of the red colour channel with a uniform brightness value which is predefined for the red colour channel, displaying the green illumination image 24 by way of an activating of the light elements of only the green colour channel of the screen 7 and by way of activating all activated light elements of the green colour channel with a uniform brightness value which is predefined for the greed colour channel, and displaying the blue illumination image 25 by way of activating the light elements of only the blue colour channel of the green and by way of activating all activated light elements of the blue colour channel with a uniform brightness value which is predefined for the blue colour channel.

Alternatively to the uniform brightness values, the activated light elements of the respective colour channel could also be activated for example with different brightness values which differ from one another for example according to a gradient (across the screen).

The non-activated light elements of the respective remaining colour channels are switched off or are each activated with a smallest possible brightness value.

The white image 26 is produced by way of the control unit 8 activating all light elements of the screen and activating them with the largest possible brightness value. The black image 27 is produced by way of the control unit 8 switching off or deactivating all light elements of the screen 7 or activating them with the smallest possible brightness value. The white illumination image and the back illumination image are used by the evaluation unit 13 for calibrating the remaining measurement images and for estimating the surrounding light influences.

The illumination images 23, 24, 25, 26, 27 of the first illumination image sequence each completely fill out the total image area 22 of the screen 7. Apart from the aforementioned brightness values, the first illumination image sequence is defined by the following illumination parameters:

total number of illumination images, in this case all three colour images, a white image and a black image,
sequence of the illumination images, in this case for example the sequence red, green, blue, white, black (or a basically any other predefined sequence),
display duration of the illumination images, in this example in a range between 100 ms and 200 ms, for example 150 ms,
temporal interval between the displaying of the individual illumination images, in this example in a range between 5 ms and 10 ms, for example 7 ms.

In FIG. 4, the mobile electronic device 2 is shown in a lateral view, whilst one of the illumination images of the predefined first illumination image sequence, for example the red illumination image 23 is displayed by way of the screen 7. Furthermore, a part of a measured object 38 which is arranged in the observation region 20 of the camera 6 is further represented. During the displaying of the illumination image 23, the screen 7 of the device 2 emits red light (represented in FIG. 4 by dashed lines) and illuminates the measured object 38 with this red light. On synchronously capturing the measurement image which belongs to the illumination image 23, the light which is reflected by the measured object 23 (represented in FIG. 4 by dashed lines) is captured by the camera 6 and illuminates the image sensor 21. This is accordingly repeated for the other illumination images of the first illumination image sequence.

The electronic device of the system 1 shown in FIG. 1 is shown once again in a front elevation in FIGS. 5A to 5E, wherein an illumination image of a second predefined illumination image sequence is displayed by way of the screen 7. In the shown example, this second illumination image sequence comprises: a first illumination image 28, a second illumination image 29, a third illumination image 30 and a white illumination image 31 (white image). Furthermore, a black illumination image 32 (black image) is displayed. The white image 31 does not differ from the white image 26 of the first illumination image sequence. Likewise, the black image 32 does not differ from the black image 27 of the first illumination image sequence.

The first, second and third illumination image 28, 29, 30 are each continuous and each only fill a part-region 33 of the total image area 22 of the screen 7. For example, the light elements of the screen 7 within the respectively filled-out part-region 33 are activated with the greatest possible brightness value in each colour channel. Outside the respectively filled-out part-region 33, the light elements are switched off or not activated, thus do not illuminate or only with the smallest possible brightness. The respectively filled out part-regions 33 of the illumination images doe not mutually overlap on the screen 7. The part-region 33 which is respectively filled out by the illumination images in this example corresponds to ⅓ of the total image area 22 of the screen 7. Alternatively, the illumination image sequence could however also comprise another number of such illumination images, for example R illumination images which each fill out only 1/Rth of the total image area of the screen, wherein R for example is a natural number which is larger than 3 and smaller than 20.

The filled-out part-regions 33 of the first, second and third illumination image 28, 29, 30 differ in their arrangement on the screen 7. In the shown view, the total image area 23 of the screen 7 has an upper edge 34, a lower edge 35, a left edge 36 and a right edge 37. The filled-out part-regions 33 of the illumination images 28, 29, 30 differ in their distance from the upper edge 34 and therefore also from the lens 18 of the camera 5 which is arranged above the upper edge 34 of the total image area 23 of the screen 7.

Apart from the brightness values which are defined above, the second illumination image is defined by the following further illumination parameters:

total number of the illumination images, in this case three white illumination images which each fill out only a part-region 33 of the screen 7, as well as a white image and a black image, sequence of the illumination images, in this case for example the sequence first, second, third illumination image, white image 31, black image 32 (or a basically any other predefined sequence), display duration of the illumination images, in this example in a range between 100 ms and 200 ms, for example 150 ms, temporal interval between the displaying of the individual illumination images, in this example in a range between 5 ms and 10 ms, for example 7 ms.

The control unit 8 of the mobile electronic device 2 is accordingly configured to activate the screen 7 of the mobile electronic device 2 into displaying illumination images of the second illumination image sequence and capturing measurement images synchronously with this, as has already been described in the context of the first illumination image sequence.

In FIGS. 6A and 6C, the mobile electronic device 2 is each shown in a lateral view, wherein the first, second and third illumination image 28, 29, 30 of the second illumination image sequence is displayed by way of the screen 7. Furthermore, a part of a measured object 38 which is arranged in the observation region 20 of the camera 6 is represented once again. During the displaying of the illumination images 23, the screen 7 of the device 2 emits light (represented in FIG. 4 by dashed lines) and illuminates the measured object 38 in each case from a different direction. On synchronously capturing the measurement image which belongs to the illumination image 23, the light which is reflected by the measured object 23 (represented in FIG. 4 by dashed lines) is captured by the camera 6 and illuminates the image sensor 21.

For example, it is possible to select between the first and the second illumination image sequence via the user interface 16 of the device 2. One can also envisage the control unit 8 automatically selecting between the first and the second illumination image sequence, for example depending on the type of the measured object 38 or depending on a characteristic of the measured object 38 which is to be examined. For example, the type of measured object 38 and the characteristic which is to be examined can be inputted via the user interface 16. The evaluation unit 13 is configured to carry out the evaluation of the measurement images in dependence on this input.

The evaluation can in principle be dependent on further variables which are determined by way of the device, for example on a current time and current location coordinates of the device 2 during the capturing of the measurement images. The time for example can have been determined by a system clock of the device and the location coordinates by way of a GPS module 4 of the device 2. For example, each measurement image can carry a corresponding time signature and location signature. In this manner, location-dependent influence variables can be determined, said influence variables correlating with the characteristics of the measured object which are to be examined or influencing these. This is the case for example if the measured object which is to be examined for example is human hair and the characteristic which is to be examined is for example the gloss of the air, since the respective predominant hair structure is different in different regions of the earth. Furthermore, the functionality of the system can be controlled, restricted or completely prevented on the basis of the GPS data. For example, the control unit 8 can be configured to carry out the method in an unrestricted manner only in certain countries or smaller geographic regions (e.g. production locations, shopping centres), to carry out the method (in particular the capturing of the measurement images and/or their evaluation) only in a limited or modified manner in other countries or smaller geographic regions (e.g. production locations shopping centres) and to completely block the implementation of the method in other countries or smaller geographic regions (e.g. production locations, shopping centres).

FIG. 7 shows a schematic representation of several measurement images 39 which have been captured from the measured object 238 by the device of the system 1 which is shown in FIG. 1. For example, the shown measurement images 39 are measurement images which have been captured synchronously with the displaying of the illumination images 23 to 27 of the first illumination image sequence, or measurement images which have been captured synchronously with the displaying of the illumination images 28 to 32 of the second illumination image sequence.

Each of the measurement images 39 which have been recorded by way of the camera 6 comprises a multitude of image points 40 (pixels) which are arranged in an overall grid and which are assigned to the sensor units of the image sensor and whose positions within the respective measurement image are defined by two image coordinates (XY) which are dependent on the sensor coordinates of the respective sensor units or correspond to these. The measurement images 39 comprise image data in which image information is coded, in particular brightness values of the respective image points of the measurement images. The brightness values of the image points 40 of the measurement images 39 are dependent for example on the charged or discharged state of the sensor elements of respectively assigned sensor units of the image sensor 21 on capturing the respective measurement image 39.

As is likewise represented in FIG. 6, the image points 40 of the measurement images 39 are brought together into a registered measurement image 41 by way of the evaluation device 13 of the device (alternatively by way of the evaluation unit 14 of the computer 3) for example by way of a image registration, and the image data of merged image points 40 are grouped into measurement data sets of the respective merged image points 40 of the registered measurement image 41. For the image registration of the measurement images 38, if necessary, image transformations of the measurement images 39 are carried out, e.g. (local) coordinate transformations (rotation, translation, tilting and/or (local) rescaling, subpixel interpolation).

Furthermore, an object recognition algorithm is carried out for example by way of the evaluation unit 13 of the device (alternatively by way of the evaluation unit 14 of the computer 3) on the basis of the register measurement image 40 in order to identify object image points 42 in the registered measurement image 41, i.e. those image points 40 which image the object points 43 of the measured object 38. The object recognition algorithm is based for example on a region growing algorithm, as described further above.

If the measurement images 39 are measurement images which have been captured synchronously with the displaying of the illumination images 23 and 27 of the first illumination image sequence, then each of the measurement data sets can be for example the afore-described "spectral fingerprint" F(d, c) of the measured object in the respective associated object point 43 of the measured object 38, whose components are defined for example as is specified in Table 1. The index d is defined by d={r, g, b, w, s}, wherein r, g, b stand for red, green, and blue illumination image 23, 24, 25 respectively and w for the white image 26, and s for the black image 27. Accordingly, the index c stands for the colour channels of the camera 6 and is defined by c={r, g, b} wherein r, g, b stand for the red, green, and blue colour channel of the camera 6 respectively.

If the measurement images 39 are measurement images which have been captured synchronously with the displaying of the illuminating images 28 to 32 of the second illumination image sequence, then the grouped measurement data sets of the individual object image points 52 are for example the afore-described "gloss measurement vectors" G(a), wherein the index a represents the individual illumination images of the first illumination image sequence. As has been described above, with regard to the first, second, and third illumination image 28, 29, 30 of the second illumination image sequence, all colour channels of the screen 7 are activated with the largest possible brightness value in the respective part-regions 33, so that these illumination images appear white. For example, the gloss measurement vector G(a) comprises the total brightness value which is measured with all sensor elements of the camera 6 (in the object image point 42), for each index a.

In principle, any additional number of further illumination image sequences can be defined, these being matched to the respective application case, i.e. to the respective measured object and the respective characteristics of the measured object which is to be examined. As has already been described above, an illumination image sequence can comprise illumination images which differ from one another in their position a on the screen as well as in their colour. For example, the aforedescribed spectral fingerprint F(c, d) can be acquired for each position a, wherein the coloured illumination images only fill out the described part-region 33 in the respective position. In this manner, for example the afore-described measurement data set H(c, d, a) can be produced for each object point, wherein this measurement data set comprises information on the spectral reflection characteristics as well as on the gloss of the measured object in the respective object point.

The evaluation unit 13 is configured for example to compare each measurement data set F(c, d) (or alternatively G(a) or H(c, d, a)) which belongs to an object image point 42, with several predefined reference data sets. The reference data sets are stored for example in the data memory 9 of the mobile electronic device 2. The comparison is effected for example by way of a mathematic classification model on the basis of an—accordingly trained—artificial neural network. A ranking is produced for example on classification, in which ranking the less the respective measurement data set differs from the reference data set, the greater the rank that this reference data set obtains. After the comparison of all measurement data sets with the reference data sets, the evaluation unit 12 identifies that reference data set which has obtained the uppermost rank the most number of times. Subsequently, an assessment of a characteristic of the measured object, said assessment belonging to this indentified reference data set, or a classification of the measured object is outputted via the user interface 16.

The evaluation unit is moreover configured, whilst taking into account the spectral sensitivity $C_c(\lambda)$ of the camera and the spectral emission characteristics $D_d(\lambda)$ of the screen, to determine a reflection characteristic of the measured object from the measurement data sets.

Depending on the case of application, which can be specified for example via the user interface 16, the refection characteristic which is to be determined is for example the refection spectrum $S(\lambda)$ of the measured object (in the respective object points). For example, the evaluation unit 13 can be configured to (approximately) determine the reflection spectrum $S(\lambda)$ from the measured "spectral fingerprint" F(d, c) whist using the equations 1 to 4 which have been described above or to determine values for the spectral channels $S^k$ as an approximation for the reflection spectrum $S(\lambda)$.

Alternatively, the refection characteristic which is to be determined is for example the dependency of the reflection degree of the measured object (in the respective object points) on the angle of incidence of the light upon the measured object (in the respective object points). For example, the evaluation unit can be configured to estimate the angularly dependent reflection degree on the basis of the afore-described gloss measurement vector G(a) (or of the measurement data set H(c, d, a)) for each object point.

The evaluation unit 13 is further configured to compare the determined reflection characteristic of the measured object, i.e. for example the spectral channels $S^k$ or the determined values for the angularly dependent reflection degree, with at least one predefined reference reflection characteristic and to classify the measured object accordingly, for example by way of a classification model on the basis of an artificial neural network, as described above.

The results of the evaluation can subsequently be displayed on the screen 7 and be stored in the data memory 11 of the device.

The method which can be carried out with the system is represented in FIG. 7 in the form of a flow diagram.

Step 1 comprises:
  activating the screen 7 of the mobile electronic device 2
    by way of the control unit 8, into successively displaying several different illumination images of the predefined illumination image sequence, activating the camera 6 of the mobile electronic device 2 into capturing a measurement image 39 of the measured object 38 synchronously with the displaying of each illumination image of the predefined illumination image sequence.

Step 2 comprises:

registering the measurement images 39 into a registered measurement image 41.

Step S3 comprises:

a spectral pre-processing, such as for example a consideration of surrounding light influences, in particular using one or more measurement images of the measured object which have been recorded given a switched off display or during the display of a black illumination image. Given environmental light influences which are too severe, a corresponding warning can be outputted to the user, for example by way of the screen 7 or by way of a sound or vibration alarm.

Step S4 comprises:

a pixel-wise pattern classification, in which measurement data sets belonging to image points or object image points 42 of the registered measurement image 41 are classified for example by way of a mathematical classification model on the basis of an artificial neural network.

Step S5 comprises:

aggregation of the results, for example by way of a ranking and/or a majority decision.

Step 6 comprises:

displaying the results, for example by way of the screen 7, and storing the results, for example by way of a data memory 9 of the device and/or the data memory 11 of the computer 3.

In principle, it is possible to carry out the steps S2 to S6 solely with the evaluation unit 13 of the device 2 or, after a corresponding transfer of the measurement images 39, with the evaluation unit 14 of the computer 3.

The measured object 38 can be formed by a human (or alternatively animal) hair. A characteristic which is to be examined can be for example the gloss of the hair. Other possible examples for the measured object 38 and characteristics which are to be examined are specified under the application complexes 1 to 4 which have been specified above.

Amongst other things, the following embodiment examples are described for the suggested method:

1. A method for capturing measurement images of a measured object with a system of the type suggested here, comprising the steps:

by way of the control unit, activating the screen of the mobile electronic device into successively displaying several different illumination images of the predefined illumination image sequence, activating the camera of the mobile electronic device into capturing a measurement image of the measured object synchronously with the displaying of each illumination image of the predefined illumination image sequence.

2. A method according to example 1, wherein the screen of the mobile electronic device comprises several colour channels, wherein the screen has a channel-specific spectral emission characteristic in each of the colour channels, wherein the screen comprises a multitude of light elements which are arranged in a grid, wherein each of the colour channels is formed by a subset of the light elements of the screen, whose spectral emission characteristics correspond to the channel-specific spectral emission characteristics of the respective colour channel.

3. A method according to example 2, further comprising:

activating the screen of the mobile electronic device into displaying one or more of the illumination images of the predefined illumination image sequence by way of activating the light elements of only a single colour channel of the screen and by way of activating all activated light elements of this colour channel with a uniform brightness value which is predefined for this colour channel, or by way of activating the light elements of several colour channels and by way of activating all activated light elements with a uniform brightness value which is predefined for the respective colour channel, or by way of activating the light elements of one or more colour channels and by way of activating all active light elements with a gradient which is predefined for the respective colour channel.

4. A method according to one of the examples 2 or 3, wherein the screen of the mobile electronic device comprises a red colour channel, a green colour channel and a blue colour channel, wherein the illumination sequence comprises a red illumination image, a green illumination image and a blue illumination image, wherein the method comprises:

activating the screen into displaying the red illumination image by way of activating the light elements of only the red colour channel of the screen and by way of activating all activated light elements of the red colour channel with a uniform brightness value which is predefined for the red colour channel, displaying the green illumination image by way of activating the light elements of only the green colour channel of the screen and by way of activating all activated light elements of the green colour channel with a uniform brightness value which is predefined for the green colour channel, and/or displaying the blue illumination image by way of activating the light elements of only the blue colour channel of the screen and by way of activating all activated light elements of the blue colour channel with a uniform brightness value which is predefined for the blue colour channel.

5. A method according to one of the preceding examples, wherein one or more of the following image characteristics of each illumination image of the predefined illumination image sequence is or are predefined:

a spectral composition of the light which is emitted by the screen on displaying the respective illumination image and/or for each colour channel of the screen, a uniform brightness value, inasmuch as this example relates back to one of the examples 2 to 4, and/or a screen region which is filled out by the respective illumination image, and/or an arrangement of a screen region which is filled out by the respective illumination image, within the total image area of the screen.

6. A method according to one of the preceding examples, wherein each of the illumination images fills out only a part-region of the total image area of the screen, wherein the filled-out part-regions of the illumination images differ from one another in their arrangement on the total image area of the screen.

7. A method according to example 6, wherein the total image area of the screen comprises an upper edge, a lower edge, a left edge, and a right edge, wherein the filled-out part-regions of the illumination images differ from one another in their distance from the upper edge of the total image area of the screen, wherein the lens is arranged above the upper edge of the total image area of the screen.

8. A method according to one of the preceding examples, wherein the system comprises at least one data memory in which illumination parameters which partly or completely define the predefined illumination image sequence are stored, wherein the method comprises:
   retrieving the illumination parameters which are stored in the at least one data memory, from the data memory and
   determining the predefined illumination image sequence on the basis of the retrieved illumination parameters.

9. A method according to one of the preceding examples, wherein the camera of the mobile electronic device comprises several different colour channels, wherein the camera has a channel-specific spectral sensitivity for each of the colour channels, wherein the camera comprises an image sensor which comprises a multitude of sensor elements which are arranged in a grid, wherein each of the colour channels of the camera is formed by a subset of the sensor elements of the image sensor, whose spectral sensitivities correspond to the channel-specific sensitivity of the respective colour channel of the camera.

10. A method according to example 9, wherein the camera of the mobile electronic device comprises a red colour channel, a green colour channel, and a blue colour channel.

11. A method according to one of the preceding examples, wherein each of the measurement images comprises a multitude of image points as well as image data which is assigned to the image points, wherein the method comprises:
   merging the image points of the measurement images,
   grouping the image data of merged image points into measurement data sets of the respectively merged image points.

12. A method according to example 11, wherein the image points of the measurement images are brought together by way of an image registration of the measurement images (39).

13. A method according to one of the examples 11 and 12, wherein the measurement data sets are evaluated by way of an algorithm which has been calibrated or trained by way of machine learning.

14. A method according to example 13, wherein the algorithm has been trained by way of a monitored learning method or by way of a non-monitored learning method.

15. A method according to one of the examples 11 to 14, wherein the measurement data sets are evaluated by way of a classification method.

16. A method according to one of the examples 11 to 15, wherein the measurement data sets are evaluated by way of an artificial neural network.

17. A method according to one of the examples 11 to 16, comprising:
   comparing each of the measurement data sets with at least one predefined reference data set.

18. A method according to one of the examples 11 to 17, comprising:
   determining at least one reflection characteristic of the measured object from the measurement data sets, preferably whilst taking into account a spectral sensitivity of the camera and a spectral emission characteristic of the screen.

19. A method according to one of the examples 11 to 18, comprising:
   comparing the determined at least one reflection characteristics of the measured object with at least one predefined reference reflection characteristic.

20. A method according to one of the examples 11 to 19, combined with one of the examples 2 to 5 and one of the examples 9 or 10, wherein the screen comprises M colour channels and the camera N colour channels, wherein M>1 and N>1, wherein each measurement data set comprises at least M×N measurement values (F(d, c) with $1 \leq d \leq M$ and $1 \leq c \leq N$), wherein the M×N measurement values correspond to M×N different combinations of colour channels of the screen with the colour channels of the camera.

21. A method according to one of the preceding examples, wherein the mobile electronic device comprises a user interface, the method further comprising:
   setting or specifying the predefined illumination image sequence via the user interface and/or
   selecting between different predefined illumination image sequences by way of the user interface and/or
   selecting between different measured objects and/or between different characteristics of a measured object which are of interest, by way of the user interface, selecting (for example automatically by way of a control unit of the mobile device) a predefined illumination image sequence between several stored predefined illumination image sequences, in dependence on the made selection of a measured object and/or of a characteristic of interest.

22. A method according to one of the preceding examples, comprising:
   capturing the measurement images of a calibration normal,
   calibrating the mobile device whilst using the measurement images of the calibration normal and a stored reference data set which belongs to the calibration normal, in particular calibrating the camera and/or calibrating the screen of the mobile device.

23. A method according to one of the preceding examples, wherein the screen is designed as a touchscreen.

24. A method according to one of the preceding examples, wherein the mobile electronic device is a smartphone or a tablet computer.

The suggested computer program product which can be loaded into an internal data memory of the mobile electronic device comprises for example software code sections, with which the steps of the method according to one of the examples 1 to 24 are carried out when the computer program product runs on the mobile electronic device.

Furthermore, a calibration mode of the device 2 can be activated via the user interface 16 of the mobile device 2. The control unit 8 and the evaluation unit 13 of the mobile device 2 are configured to capture and evaluate the described measurement images of a calibration normal in the calibration mode. For the purpose of this capture, the calibration normal is held in the observation region 20 of the camera 6 by the user. As described, the values for the spectral channels $S^k$ are computed from the measurement images by way of the evaluation unit 13 and are subsequently compared to a reference data set which belongs to this calibration normal and which is stored in the data memory 9 of the mobile device 2. The values of the variables $D_d(\lambda)$ and $C_c(\lambda)$ are automatically recalculated on the basis of this comparison and are stored in the data memory 9 for further measurements.

LIST OF REFERENCE NUMERALS 1 system
2 device
3 computer
4 computer network
5 housing
6 camera
7 screen
8 control unit
9 data memory
10 computer program product
11 data memory
12 processor
13 evaluation unit
14 evaluation unit
15 processor
16 user interface
17 data interface
18 lens
19 front side
20 observation region
21 image senor
22 total image area
23 to 32 illumination image
33 part-region
34 upper edge
35 lower edge
36 left edge
37 right edge
38 measured object
39 measurement images
40 image point
41 measurement image
42 object image point
43 object point
44 GPS module
45 energy store

The invention claimed is:

1. A method for capturing a measurement image of a measured object, the method comprising:
capturing a measurement image of a measured object within an observation region of a camera of a mobile electronic device;
displaying a light-emitted image on a screen of the mobile electronic device;
causing the screen of the mobile electronic device to successively display multiple illumination images of a predefined illumination image sequence, wherein the camera is activated to capture the measurement image of the measured object synchronously with the displaying of each of the illumination images of the predefined illumination image sequence, wherein the screen of the mobile electronic device includes a colour channel, wherein the screen has a channel-specific spectral emission characteristic of the colour channel, wherein the screen comprises multiple light elements arranged in a grid, wherein the colour channel is formed by a subset of the light elements of the screen, and wherein a spectral emission characteristic of the light elements correspond to the channel-specific spectral emission characteristic of the respective colour channel; and
causing the screen of the mobile electronic device to display one or more of the illumination images of the predefined illumination image sequence, wherein causing the screen to display one or more of the illumination images includes activation of at least one of:
the light elements of a single colour channel of the screen, wherein all activated light elements of the single colour channel have a uniform brightness value which is predefined for the single colour channel,
the light elements of multiple colour channels, wherein all activated light elements in each of the colour channels have a uniform brightness value which is predefined for the respective colour channel, or
the light elements of one Or more colour channels, wherein all active light elements in each of the one or more colour channels have a gradient which is predefined for the respective colour channel;
wherein the mobile electronic device comprises a user interface, wherein the predefined illumination image sequence is set via the user interface, wherein a selection between different predefined illumination image sequences is rendered using the user interface, wherein a selection between different measured objects or between different characteristics of a measured object of interest is rendered using the user interface and wherein a control unit is configured to select a predefined illumination image sequence between several stored predefined illumination image sequences in dependence on a selection of at least one of: the measured object of interest or of a characteristic of interest.

2. The method of claim 1, wherein, the screen of the mobile electronic device comprises:
a red colour channel;
a green colour channel; and
a blue colour channel;
wherein the illumination sequence comprises:
a red illumination image;
a green illumination image; and
a blue illumination image;
wherein a control unit of the mobile electronic device is configured to activate the screen to display at least one of: the red illumination image, wherein the light elements of the red colour channel of the screen are activated with a uniform brightness value which is predefined for the red colour channel, the green illumination image, wherein the light elements of the green colour channel of the screen are activated with a uniform brightness value which is predefined for the green colour channel, or the blue illumination image, wherein the light elements of the blue colour channel of the screen are activated with a uniform brightness value which is predefined for the blue colour channel.

3. The method of claim 1, wherein at least one of the following image characteristics of each of the illumination images of the predefined illumination image sequence is or are predefined:
a spectral composition of the light which is emitted by the screen when at least one of the illumination images is displayed on the screen;
a uniform brightness value for each colour channel of the screen;
a screen region which is filled out when the at least one of the illumination images is displayed on the screen; or
an arrangement of a screen region which is filled out when the at least one of the illumination images is displayed within a total image area of the screen.

4. The method of claim 3, wherein each of the illumination images fills out only a partial region of the total image area of the screen, and wherein the filled-out partial region of a particular one of the illumination images differs from the filled-out partial region of another particular one of the illumination images in its arrangement on the total image area of the screen.

5. The method of claim 4, wherein the total image area of the screen comprises an upper edge, wherein the filled-out partial region of the particular one of the illumination images and the filled-out partial region of the another particular one of the of the illumination images differ from one another in their distance from the upper edge of the total image area of the screen, and wherein a lens is arranged above the upper edge of the total image area of the screen.

6. The method of claim 1, wherein the camera of the mobile electronic device comprises multiple colour channels, wherein the camera has a channel-specific spectral sensitivity for each of the colour channels, wherein the camera comprises an image sensor which comprises a multiple sensor elements arranged in a grid, wherein each of the colour channels of the camera is formed by a subset of the sensor elements of the image sensor, and wherein a spectral sensitivity of each of the sensor elements of the image sensor correspond to the channel-specific sensitivity of the respective colour channel of the camera.

7. The method of claim 1, wherein the camera of the mobile electronic device includes a red colour channel, a green colour channel, and a blue colour channel.

8. The method of claim 1, wherein the measurement image includes multiple image points and image data which is assigned to the image points.

9. The method of claim 8, further comprising:

merging, using an evaluation unit, the image points of the measurement image; and grouping image data of merged image points into a measurement data set of respective merged image points.

10. The method of claim 9, wherein the evaluation unit is configured to evaluate the measurement data set using an artificial neural network.

11. A non-transitory machine-readable medium comprising instructions, which when executed by a computing device, configure the computing device to perform the method of claim 1.

12. A method for capturing a measurement image of a measured object, the method comprising:

capturing a measurement image of a measured object within an observation region of a camera of a mobile electronic device;

displaying a light-emitted image on a screen of the mobile electronic device; and causing the screen of the mobile electronic device to successively display multiple illumination images of a predefined illumination image sequence, wherein the camera is activated to capture the measurement image of the measured object synchronously with the displaying of each of the illumination images of the predefined illumination image sequence, wherein the screen of the mobile electronic device includes a colour channel, wherein the screen has a channel-specific spectral emission characteristic of the colour channel, wherein the screen comprises multiple light elements arranged in a grid, wherein the colour channel is formed by a subset of the light elements of the screen, and wherein a spectral emission characteristic of the light elements correspond to the channel-specific spectral emission characteristic of the respective colour channel, and wherein at least one of the following image characteristics of each of the illumination images of the predefined illumination image sequence is or are predefined:

a spectral composition of the light which is emitted by the screen when at least one of the illumination images is displayed on the screen, a uniform brightness value for each colour channel of the screen;

a screen region which is filled out when the at least one of the illumination images is displayed on the screen; or an arrangement of a screen region which is filled out when the at least one of the illumination images is displayed within a total image area of the screen;

wherein the mobile electronic device comprises a user interface, wherein the predefined illumination image sequence is set via the user interface, wherein a selection between different predefined illumination image sequences is rendered using the user interface, wherein a selection between different measured objects or between different characteristics of a measured object of interest is rendered using the user interface, and wherein a control unit is configured to select a predefined illumination image sequence between several stored predefined illumination image sequences in dependence on a selection of at least one of: the measured object of interest or of a characteristic of interest.

13. The method of claim 12, wherein the measurement image includes:

multiple image points; and image data assigned to the image points;

wherein the method further comprises:

merging, using an evaluation unit, the image points of the measurement image; and grouping image data of merged image points into a measurement data set of respective merged image points.

14. The Method of claim 13, wherein merging the image points of the measurement image is done by an image registration of the measurement images.

15. The method of claim 13, further comprising:

evaluating, using the evaluation unit, the measurement data set using an algorithm calibrated or trained using machine learning.

16. A non-transitory machine-readable medium comprising instructions, which when executed by a computing device, configure the computing device to perform the method of claim 12.

17. A method for capturing a measurement image of a measured object, the method comprising:

capturing a measurement image of a measured object within an observation region of a camera of a mobile electronic device, wherein the mobile device is switchable into a calibration mode, wherein the mobile device is configured, in the calibration mode, to capture the measurement image of the calibration normal and carry out a calibration of the mobile device, and wherein the calibration of the mobile device include at least one of: calibration of the camera or calibration a screen of the mobile electronic device, using the measurement image of the calibration normal and of a stored reference data set which belongs to the calibration normal;

displaying a light-emitted image on the screen of the mobile electronic device; and causing the screen of the mobile electronic device to successively display multiple illumination images of a predefined illumination image sequence, wherein the camera is activated to capture the measurement image of the measured object synchronously with the displaying of each of the illumination images of the predefined illumination image sequence;

wherein the mobile electronic device comprises a user interface, wherein the predefined illumination image sequence is set via the user interface, wherein a selection between different predefined illumination image set sequences is rendered using the user interface, wherein a selection between different measured objects or between different characteristics of a measured object of interest is rendered using the user interface, and wherein a control unit is configured to select a predefined illumination image sequence between several stored predefined illumination image sequences in dependence on a selection of at least one of: the measured object of interest or of a characteristic of interest.

18. The method of claim 17, wherein the measurement image includes:

multiple image points; and image data which is assigned to the image points;

wherein the method further comprises:

merging, using an evaluation unit, the image points of the measurement image; and grouping image data of merged image points into a measurement data set of respective merged image points.

19. The method of claim 18, wherein the evaluation unit is configured to compare the measurement data set with at least one predefined reference data set, wherein the evaluation unit is configured to determine at least one reflection characteristic of the measured object from the measurement data set, wherein the determination of the at least one reflection characteristic uses a spectral sensitivity of the camera and a spectral emission characteristic of the screen, and wherein the evaluation unit is configured to compare the at least one determined reflection characteristic of the measured object with at least one predefined reference reflection characteristic.

20. A non-transitory machine-readable medium comprising instructions, which when executed by a computing device, configure the computing device to perform the method of claim 17.

* * * * *